United States Patent
Chen et al.

(10) Patent No.: US 10,108,754 B2
(45) Date of Patent: Oct. 23, 2018

(54) METHOD FOR RUGGEDIZING INTEGRATED COMPUTATIONAL ELEMENTS FOR ANALYTE DETECTION IN THE OIL AND GAS INDUSTRY

(71) Applicant: Halliburton Energy Services, Inc., Houston, TX (US)

(72) Inventors: Dingding Chen, Tomball, TX (US); James M. Price, Spring, TX (US); Bin Dai, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/508,904

(22) PCT Filed: Oct. 30, 2015

(86) PCT No.: PCT/US2015/058206
§ 371 (c)(1),
(2) Date: Mar. 3, 2017

(87) PCT Pub. No.: WO2017/074408
PCT Pub. Date: May 4, 2017

(65) Prior Publication Data
US 2017/0270225 A1      Sep. 21, 2017

(51) Int. Cl.
*G06F 17/50*   (2006.01)
*G06N 3/02*    (2006.01)
(Continued)

(52) U.S. Cl.
CPC .............. *G06F 17/50* (2013.01); *G06F 17/30* (2013.01); *G06N 3/02* (2013.01); *E21B 47/00* (2013.01)

(58) Field of Classification Search
CPC .. G01V 3/20; G01V 3/30; G06F 17/50; G06F 17/30; E21B 47/00; E21B 47/102; E21B 49/005; E21B 47/042; G06N 3/02
(Continued)

(56) References Cited

U.S. PATENT DOCUMENTS 9,097,649 B2 *   8/2015   Simcock ................. G06F 17/50
2006/0142955 A1   6/2006   Jones et al.
(Continued)

FOREIGN PATENT DOCUMENTS

WO   2014137322 A1   9/2014
WO   2015112177 A1   7/2015

OTHER PUBLICATIONS

International Search Report and Written Opinion for PCT/US2015/058206 dated Jul. 28, 2016.

*Primary Examiner* — Jermele M Hollingston
*Assistant Examiner* — Suresh K Rajaputra
(74) *Attorney, Agent, or Firm* — Gilliam IP PLLC

(57) ABSTRACT

A method for ruggedizing an ICE design, fabrication and application with neural networks as disclosed herein includes selecting a database for integrated computational element (ICE) optimization is provided. The method includes adjusting a plurality of ICE operational parameters according to an environmental factor recorded in the database and simulating environmentally compensated calibration inputs. The method includes modifying a plurality of ICE structure parameters to obtain an ICE candidate structure having improved performance according to a first algorithm applied to the database and validating the ICE candidate structure with an alternative algorithm applied to the database. Further, the method includes determining a plurality of manufacturing ICEs based on the validation with the first algorithm and the alternative algorithm, and fabricating one of the plurality of manufacturing ICEs. A method
(Continued)

for determining a fluid characteristic using a calibrated ICE fabricated as above and supplemental elements is also provided.

17 Claims, 12 Drawing Sheets

(51) Int. Cl.
*G06F 17/30* (2006.01)
*E21B 47/00* (2012.01)

(58) Field of Classification Search
USPC .......................................................... 324/324
See application file for complete search history.

(56) References Cited

U.S. PATENT DOCUMENTS

2010/0148785 A1 6/2010 Schaefer et al.
2015/0300945 A1 10/2015 Gao et al.

\* cited by examiner

METHOD FOR RUGGEDIZING INTEGRATED COMPUTATIONAL ELEMENTS FOR ANALYTE DETECTION IN THE OIL AND GAS INDUSTRY

CROSS-REFERENCE TO RELATED APPLICATIONS

The present application claims the benefit of priority under 35 U.S.C. § 371 as a national stage application of PCT International Application Serial No. PCT/US2015/058206 entitled "METHOD FOR RUGGEDIZING INTEGRATED COMPUTATIONAL ELEMENTS FOR ANALYTE DETECTION IN THE OIL AND GAS INDUSTRY," filed on Oct. 30, 2015, which is hereby incorporated by reference in its entirety for all purposes.

BACKGROUND

The present disclosure relates to design and fabrication of integrated computational element (ICE) devices and, more particularly, to ruggedization techniques that provide favorable characteristics for ICE devices used in downhole tools for fluid characterization in the oil and gas industry.

In the field of fabrication of thin-film optical sensing elements for diverse applications, a common problem is the performance of the optical sensors under different, and potentially extreme, environmental conditions. This is more acute in field applications such as encountered in the oil and gas industry where downhole optical tools are used in extreme temperature and pressure conditions. While pressure effects may be mitigated by using an appropriate housing, the operating temperature of the optical tool is very close or equal to that under harsh environment. Palliative measures may be used to compensate for environmental factors of the tool, such as applying appropriate software correction algorithms, during data analysis. However, environmental correction through post-processing alone is often inadequate if the influential factors are not appropriately taken into account at the sensor design and fabrication stage. Once the sensor elements are built with less optimal design and fabrication, it is difficult to perform effective data correction under different environmental circumstances with the expected accuracy and precision, especially in real-time.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

In the figures, elements having the same or similar reference numerals refer to the same or similar function, or step, unless otherwise noted.

DETAILED DESCRIPTION

Figure 1:
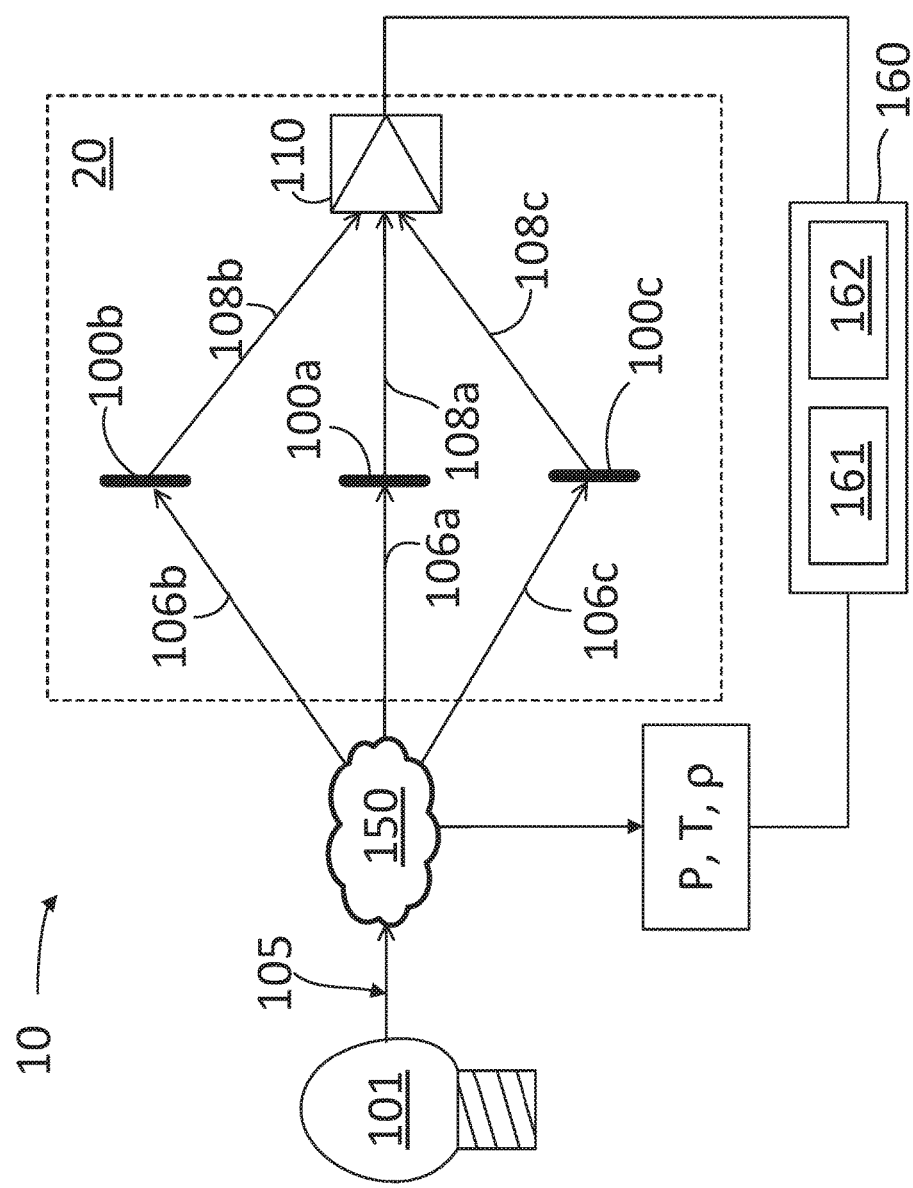
FIG. 1 illustrates an optical computing device in a downhole tool, the optical computing device configured to measure a characteristic of a fluid.

The present disclosure relates to optical thin-film based Integrated Computational Element (ICE) devices and, more particularly, to design techniques that provide optical elements used in downhole tools for determining fluid characteristics in the oil and gas industry.

Embodiments of the present disclosure include design and fabrication methods for an ICE used in a single optical computing device regardless of the sample concentration range. For example, a low methane concentration sample and a high methane concentration sample may be targeted using an optical computing device having the same ICE, according to some embodiments disclosed herein. Further, a low gas-oil-ratio (GOR) sample and a high gas-oil-ratio (GOR) sample may be targeted using an optical computing device having an ICE designed and fabricated according to methods consistent with the present disclosure. Embodiments disclosed herein improve upon conventional linear or polynomial calibration algorithms to more accurately select candidate ICE designs for fabrication. More generally, embodiments as disclosed herein take into account the power of a neural network approach to build a non-linear calibration platform beyond a higher order polynomial approximation. Further, some embodiments apply a general non-linear post-calibration algorithm after ICE fabrication. In some embodiments, the non-linear post-calibration algorithm includes input from additional optical elements in the downhole tool.

Embodiments of ICEs designed and fabricated as disclosed herein overcome environmental limitations in measurement accuracy and computing performance of optical computing devices. Some embodiments include neural network (NN) algorithms including environmental parameters in ICE design. In some embodiments, the performance of an ICE design is evaluated with an optimization loop correlating expected outputs from an ICE targeting a specific fluid characteristic with a sample database. In some embodiments, the correlation may be a simple linear model or a second-order polynomial model. Accordingly, ICE designs may be ranked according to their predictive power for detecting the specific fluid characteristic. Predictive power criteria may include, but are not limited to, minimum prediction error, standard error of calibration (SEC), standard error of performance (SEP), sensitivity, slope of the calibration curve, signal-to-noise ratio (SNR), and mean transmission value corresponding to the particular characteristic or analyte of interest.

When ICE candidate models having different multi-layer thin-film structures are generated, they may be sorted by a design suite based on, for example, prediction error and other performance measurements. In some cases, various ICE models may be sorted based on their overall SEC (i.e., chemometric predictability) as tested against a known value for the characteristic or analyte of interest. For example, the SEC for each ICE model may be calculated by taking the square root of the sum of squares between the known value for the analyte of interest and the predicted value as derived from the transmission spectrum of the ICE model. This is accomplished for each ICE model by calculating its respective transmission spectrum and applying that transmission spectrum to the known data set of the analyte of interest. More generally, the ICE model may be evaluated based on its reflection spectrum, or even based on a diffraction pattern associated with it.

Once a predictive or desired ICE model is selected for fabrication, the model is loaded into a fabrication computer program configured to instruct a fabrication machine or module to physically create the ICE core. Similar to the design suite, the fabrication computer program software may be stored on a computer-readable medium containing program instructions configured to be executed by one or more processors of a computer system. The fabrication computer program may be configured to receive or otherwise download the specifications for the desired ICE model, as generated by the design suite, and physically create a corresponding ICE core by methodically depositing the various layers of the ICE core to the specified layer thicknesses.

As used herein, the term "characteristic" refers to a chemical, mechanical, or physical property of a substance (e.g., a downhole fluid in an oil and gas rig or wellbore). A characteristic of a substance may include a quantitative or qualitative value of one or more chemical constituents or compounds present therein or any physical property associated therewith. Such chemical constituents and compounds may be referred to herein as "analytes." Illustrative characteristics of a substance that can be monitored with the optical computing devices described herein can include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "electromagnetic radiation" refers to radio waves, microwave radiation, infrared and near-infrared radiation, visible light, ultraviolet light, X-ray radiation and gamma ray radiation.

As used herein, the term "optical computing device" refers to an optical device that is configured to receive an input of electromagnetic radiation associated with a substance and produce an output of electromagnetic radiation from a processing element arranged within the optical computing device. The processing element may be, for example, an ICE, which may also be referred to as a multivariate optical element (MOE). The electromagnetic radiation that optically interacts with the processing element is changed so as to be readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through or from one or more processing elements (i.e., ICE or MOE components) or a substance being analyzed by the processing elements. Accordingly, optically interacted light refers to electromagnetic radiation that has been reflected, transmitted, scattered, diffracted, or absorbed by, emitted, or re-radiated, for example, using a processing element, but may also apply to interaction with a substance. As mentioned above, the processing element used in the above-defined optical computing devices may be an ICE. In operation, an ICE is capable of distinguishing electromagnetic radiation related to a characteristic of interest of a substance from electromagnetic radiation related to other components of the substance.

The disclosed systems and methods may be suitable for designing, evaluating, and fabricating ICE for use in the oil and gas industry. Oil and gas industries may deploy optical systems in downhole tools as disclosed herein for exploration and extraction of hydrocarbons under extreme conditions and environments. It will be appreciated, however, that the systems and methods disclosed herein are equally applicable to the design and fabrication of compact optical systems used in other fields. For instance, compact optical systems consistent with the present disclosure may be applied in the food and drug industry, industrial applications, mining industries, or any field where it may be advantageous to determine in real-time or near real-time a characteristic of a specific substance, but where environmental factors, such as temperature, pressure, humidity, vibrations and shock may have a critical impact.

This disclosure provides an ICE ruggedizing method producing an ICE with improved performance. The ICE ruggedizing method includes an optimization loop implemented with neural networks to improve ICE-dominant optical sensor development. In addition, the ICE ruggedizing method incorporates environmental factors as calibration input together with simulated ICE responses, which allows using more model coefficients to nonlinearly identify a complex system with environmental correction. In some embodiments, in addition to incorporating environmental factors in ruggedized ICE design and fabrication, a detector output from an analyte-specific ICE may be retained as a primary parameter through automatic candidate input selection during a post-calibration step after the optical sensor assembly is constructed. Embodiments consistent with the present disclosure enhance the range of operability of using a single ICE for analyte detection. Accordingly, embodiments as disclosed herein are suitable for use in the harsh and widely changeable environment of downhole measurements in the oil and gas industry for formation fluid characterization.

In a first embodiment, a method for ruggedizing an ICE as disclosed herein includes selecting a database for candidate ICE design. The method further includes adjusting a plurality of ICE parameters according to an environmental factor recorded in the database, simulating environmentally compensated calibration inputs, modifying a plurality of ICE parameters to obtain an ICE candidate structure having improved performance according to a first calibration algorithm applied to the database, validating the ICE candidate structure with an alternative calibration algorithm applied to the database, determining a plurality of manufacturing ICEs based on the validation with the first algorithm and the alternative algorithm, and fabricating one of the plurality of manufacturing ICEs.

In a second embodiment, a method for determining a fluid characteristic includes calibrating a fluid predictive model with inputs from a fabricated, analyte-specific ICE response and environmental parameters consistent with the original optimized ICE design. Besides using primary inputs, the method further includes calibrating more candidate fluid models for same analyte detection with additional inputs from other sensing elements (different ICEs and/or optical filters) available in a sensor assembly or a downhole tool. The method also includes selecting a single fluid model or an ensemble of fluid models calibrated above for rugged operational conditions using validated laboratory and field data, forming an operational fluid model for real-time data processing, and adjusting the operational fluid model according to a determination of a fluid characteristic in a specific testing condition. In some embodiments, the method includes determining a fluid characteristic using the operational fluid model, wherein the operational fluid model includes a nonlinear algorithm including an input from the fabricated, analyte-specific ICE and at least one additional input.

In a third embodiment a non-transitory, computer readable medium stores commands which, when executed by a processor in a controller, cause the controller to perform a method for ruggedizing an ICE. The method includes selecting a database for ICE design and adjusting a plurality of ICE parameters according to an environmental factor recorded in the database. The method may also include simulating environmentally compensated calibration inputs and modifying a plurality of ICE parameters to obtain an ICE candidate structure having improved performance according to a first calibration algorithm applied to the database. In some embodiments, the method may include validating the ICE candidate structure with an alternative calibration algorithm applied to the database, determining a plurality of manufacturing ICEs based on the validation with the first algorithm and the alternative algorithm, and fabricating one of the plurality of manufacturing ICEs.

FIG. 1 illustrates an optical computing device 20 that may be used in a downhole tool 10. Optical computing device 20 is configured to measure a characteristic of a fluid. Downhole tool 10 includes a light source 101 providing an illumination light 105 (i.e., electromagnetic radiation) that impinges on a sample 150 of the fluid, such as a downhole fluid encountered in the oil and gas industry during drilling and borehole logging operations. Optical computing device 20 includes ICES 100a, 100b, and 100c (hereinafter collectively referred to as ICEs 100). Accordingly, optical computing device 20 includes optical elements to direct a portion of an interacted light 106a to ICE 100a, a portion of an interacted light 106b to ICE 100b, and a portion of an interacted light 106c to ICE 100c. Further, optical computing device includes optical elements to direct a computed light 108a from ICE 100a to a detector 110, a computed light 108b from ICE 100b to detector 110, and a computed light 108c from ICE 100c to detector 110. Detector 110 may also be configured separately to receive computed light from each of the individual ICEs 100. Hereinafter, interacted lights 106a-c will be collectively referred to as interacted lights 106, and computed lights 108a-c will be collectively referred to as computed lights 108.

Without limitation, the number of ICEs 100 in optical computing device 20 may be only one, two, three (as illustrated in FIG. 1), or more. Furthermore, without limitation any one of ICEs 100 may be used with a broadband filter, a narrow band filter, a neutral density filter, a grating element, a diffraction prism, or any other type of spectroscopic resolving optical element as known to those with ordinary skill. In that regard, a first ICE 100 in a first optical computing device 20 may be associated with a first fluid characteristic, and a second ICE 100 in a second optical computing device 20 may be associated with a second fluid characteristic. Without limitation, the first fluid characteristic and the second fluid characteristic may be the same or may be different. In some embodiments, a second ICE 100 may be disassociated with the first fluid characteristic. Accordingly, a second computed light 108 may have an intensity that is unrelated to the first fluid characteristic.

A detector 110 receives computed lights 108 and generates a signal proportional to the intensity of computed lights 108. In some embodiments, downhole optical tool 10 uses available measurements from other sensors to get reference fluid pressure (P), temperature (T), density ($\rho$), and other parameters associated with sample 150, such as fluid viscosity, bubble point, and the like. Accordingly, the reference P, T, and $\rho$ data collected with downhole optical tool that are compatible to the corresponding pressure, volume, and temperature (PVT) measurements of a standard calibration database may be used as inputs of fluid predictive models.

In some embodiments, it is desirable that the intensity of at least one of computed lights 108 be proportional to the fluid characteristic being measured. In some embodiments, the intensity of computed lights 108 may be related to the fluid characteristic through a non-linear relationship involving multiple factors. For example, in some embodiments P, T and other environmental factors measured by downhole tool 10 affect the relation between computed light 108 and the fluid characteristic.

A controller 160 in downhole tool 10 uses the signal from detector 110 and the measured P, T, and $\rho$ values to determine a characteristic of the downhole fluid forming sample 150. Controller 160 may include a processor 161 and a memory 162. Memory 162 may store commands in a pre-calibrated optical signal transformation algorithm and in a fluid predictive model which, when executed by processor 161 cause controller 160 to perform at least some steps in methods for analyte detection and fluid characterization as disclosed herein. While controller 160 may be included in downhole tool 10, in some embodiments, controller 160 may be in the surface and communicating with downhole tool 10 near or at the bottom of a borehole in an oils and gas operation.

Processor 161 may be configured to perform optical fluid analysis using non-linear neural network (NN) transformation and predictive algorithms stored in memory 162. In some embodiments, processor 161 performs the non-linear optical analysis in real-time. In some embodiments, the non-linear optical signal transformation algorithm is pre-calibrated on the representative reference fluids. The non-linear optical signal transformation algorithm converts measured optical sensor responses from a tool parameter space to a synthetic parameter space. The NN fluid predictive algorithms pre-calibrated in an Optical-PVT database estimate various fluid compositions and properties from the environment compensated synthetic optical sensor responses, and are capable of providing integrated solutions for formation fluid characterization regardless of fluid types. The sensor response of each optical element on a particular fluid sample is calculated during calibration as a dot product of transmittance spectrum of the given fluid and that element at selected wavelength range. The Optical-PVT database is typically built with diverse petroleum fluid spectroscopy and analyte data at specified pressure, volume and temperature setting points. The calibration fluids for non-linear NN model development may include heavy oils, medium and light oils, gas condensates and gas, water, multiphase mixtures and other fluids relevant to downhole fluid analysis.

Figure 2:
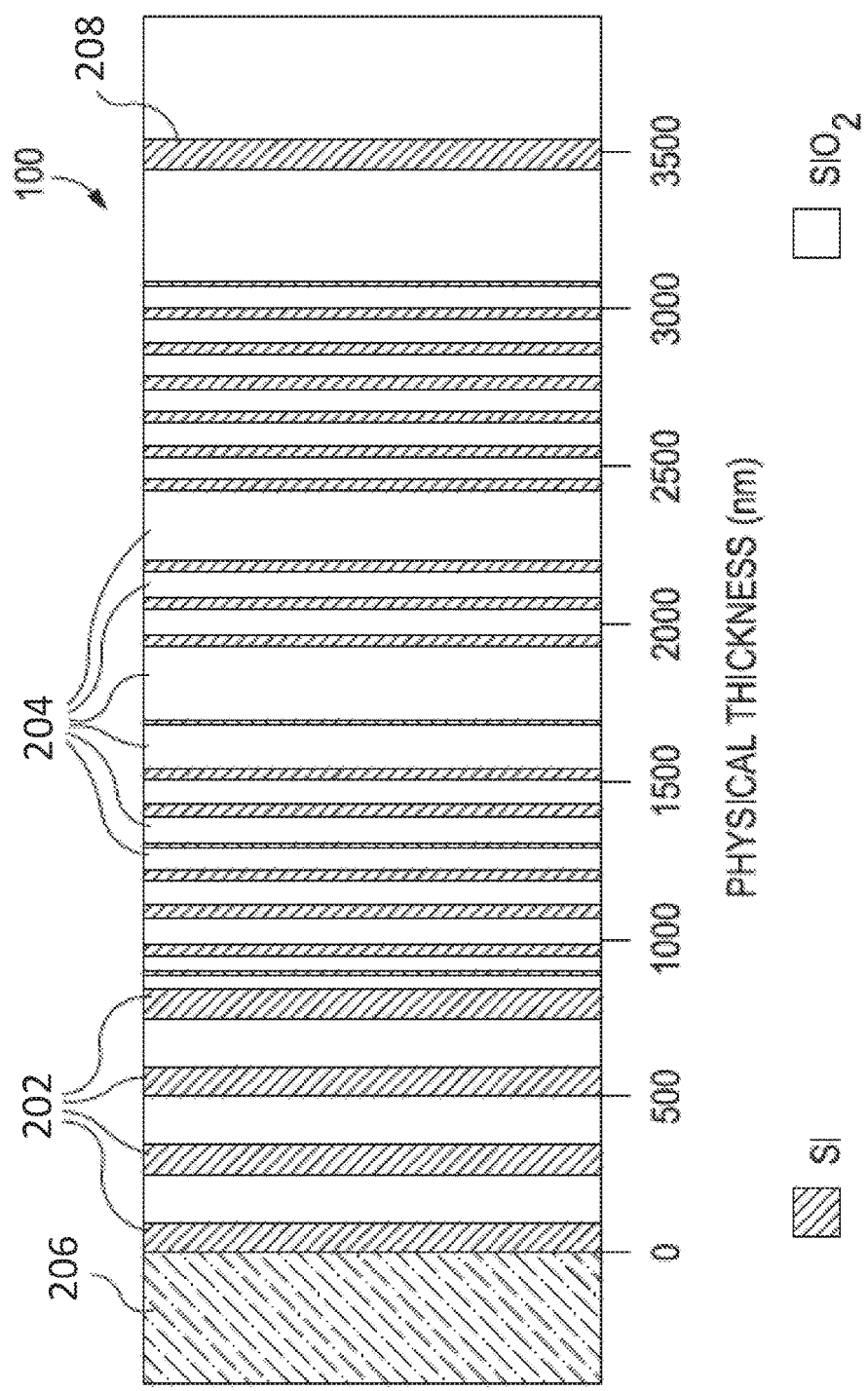
FIG. 2 illustrates an ICE for use in an optical computing device for a downhole tool.

FIG. 2 illustrates an ICE 100 for use in an optical computing device for a downhole tool. As illustrated, ICE 100 may include a plurality of alternating layers 202 and 204, such as silicon (Si) and $SiO_2$ (quartz), respectively. In general, layers 202, 204 consist of materials whose index of refraction is high and low, respectively. Other examples of materials might include niobia and niobium, germanium and germania, MgF, SiO, and other high and low index materials known in the art. Layers 202, 204 may be strategically deposited on an optical substrate 206. In some embodiments, optical substrate 206 is BK-7 optical glass. In other embodiments, the optical substrate 206 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite the optical substrate 206 in FIG. 2), the ICE 100 may include a layer 208 that is generally exposed to the environment of the device or installation, and may be able to detect a sample substance. The number of layers 202, 204 and the thickness of each layer 202, 204 are determined from the spectral attributes acquired from a spectroscopic analysis of a characteristic of the substance being analyzed using a conventional spectroscopic instrument. The spectrum of interest of a given characteristic typically includes any number of different wavelengths. It should be understood that the exemplary ICE 100 in FIG. 2 does not in fact represent any particular characteristic of a given substance, but is provided for purposes of illustration only. Consequently, the number of layers 202, 204 and their relative thicknesses, as shown in FIG. 2, bear no correlation to any particular characteristic. Nor are the layers 202, 204 and their relative thicknesses necessarily drawn to scale, and therefore should not be considered limiting of the present disclosure. Moreover, those skilled in the art will readily recognize that the materials that make up each layer 202, 204 (i.e., Si and $SiO_2$) may vary, depending on the application, cost of materials, and/or applicability of the material to the given substance being analyzed.

In some embodiments, the material of each layer 202, 204 can be doped or two or more materials can be combined in a manner to achieve the desired optical characteristic. In addition to solids, the exemplary ICE 100 may also contain liquids and/or gases, optionally in combination with solids, in order to produce a desired optical characteristic. In the case of gases and liquids, the ICE 100 can contain a corresponding vessel (not shown), which houses the gases or liquids. Exemplary variations of the ICE 100 may also include holographic optical elements, gratings, piezoelectric, light pipe, and/or acousto-optic elements, for example, that can create transmission, reflection, and/or absorptive properties of interest.

Multiple layers 202, 204 exhibit different refractive indices. By properly selecting the materials of the layers 202, 204 and their relative thickness and spacing, the ICE 100 may be configured to selectively pass/reflect/refract predetermined fractions of electromagnetic radiation at different wavelengths. Each wavelength is given a predetermined weighting or loading factor. The thickness and spacing of the layers 202, 204 may be determined using a variety of approximation methods from the spectrum of the characteristic or analyte of interest. These methods may include inverse Fourier transform (IFT) of the optical transmission spectrum and structuring the ICE 100 as the physical representation of the IFT. The approximations convert the IFT into a structure based on known materials with constant refractive indices.

The weightings that the layers 202, 204 of the ICE 100 apply at each wavelength are set to the regression weightings described with respect to a known equation, or data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. The ICE 100 may be configured to perform the dot product of the electromagnetic radiation received by the ICE 100 and the wavelength dependent transmission function of the ICE 100. The wavelength dependent transmission function of the ICE 100 is dependent on the layer material refractive index, the number of layers 202, 204 and the layer thicknesses. The ICE 100 transmission function is then analogous to a desired vector derived from the solution to a linear multivariate problem targeting a specific component of the sample being analyzed. As a result, the output light intensity of the ICE 100 is related to the characteristic or analyte of interest. The desired vector derived from the solution to a linear multivariate problem may be any one of a regression vector, a loading vector, or a plurality of loading vectors derived from a linear combination of more than one regression vector.

Optical computing devices employing such an ICE 100 may be capable of extracting the information of the spectral fingerprint of multiple characteristics or analytes within a substance and converting that information into a detectable output regarding the overall properties of the substance. That is, through suitable configurations of the optical computing devices, electromagnetic radiation associated with characteristics or analytes of interest in a substance can be separated from electromagnetic radiation associated with all other components of the substance in order to estimate the properties of the substance in real-time or near real-time. Accordingly, ICE 100 is able to distinguish and process electromagnetic radiation related to a characteristic or analyte of interest.

Before ICE 100 is physically fabricated, one or more ICE models are typically generated. Such models may be generated using, for example, a computer-based software program or design suite that may be stored on a computer-readable medium containing program instructions configured to be executed by one or more processors of a computer system. The design suite may be configured to generate several ICE device models, each being configured or otherwise adapted to detect a particular characteristic or analyte of interest.

Figure 3:
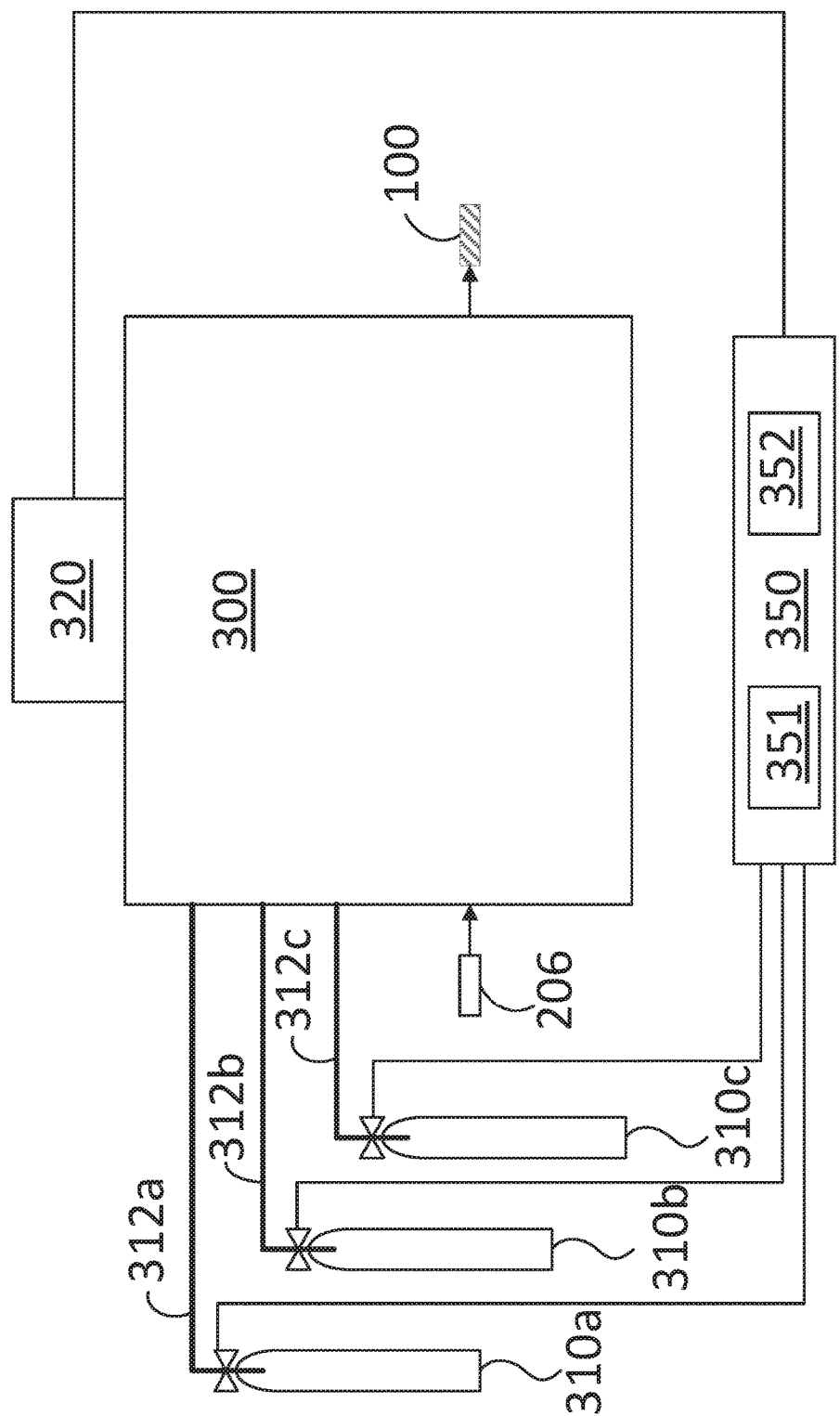
FIG. 3 illustrates an ICE fabrication chamber and accessories.

FIG. 3 illustrates an ICE fabrication chamber 300 and accessories. Fabrication chamber 300 receives substrate 206, and provides ICE 100 as a result of a multilayer deposition process. Supply containers 310a, 310b, and 310c (hereinafter collectively referred to as supply containers 310) provide the materials used to form the alternating dielectric layers in ICE 100 as they are deposited in fabrication chamber 300. The materials from supply containers 310 are introduced in chamber 300 through supply lines 312a, 312b, and 312c (hereinafter collectively referred to as supply lines 312), respectively. The timing and rate of material flow through supply lines 312 determines a desired thickness of a specific dielectric layer deposited on substrate 206 to form ICE 100. In some embodiments, fabrication chamber 300 may be as used in deposition processes such as Chemical Vapor Deposition (CVD) or Atomic Layer Deposition (ALD). Without limitation, some embodiments may use other multi-layer fabrication techniques such as a physical vapor deposition (PVD). An example of a PCD fabrication technique may include an ion-assisted E-beam deposition technique in which a solid portion of the source material used in the deposition is placed inside fabrication chamber 300 prior to start of the deposition process. In that regard, in a PVD E-beam deposition process supply lines 312 may be replaced by any other mechanism for source material delivery, as known in the art. More generally, fabrication chamber 300 may be used in any multi-layer deposition techniques known in the art as one of ordinary skill would appreciate without deviation from the concepts disclosed herein. Accordingly, a sensor 320 measures the thickness of each dielectric layer as is deposited and provides the information to a controller 350. Controller 350 includes a processor 351 and a memory 352. Processor 351 is configured to execute commands stored in memory 352, causing controller 350 to perform steps in methods as disclosed herein. For example, controller 350 may perform a method of controlling the thickness of a dielectric layer being deposited on substrate 206 by properly adjusting the material flow rate and timing through either one of supply lines 312. Alternatively, in embodiments using PVD E-beam deposition, controller 350 may adjust the E-beam current or voltage accordingly, to modify the deposition rate. In some embodiments, controller 350 may be configured to incorporate film thickness on each deposited layer as measured with sensor 320. Further, controller 350 may use the deposited film thicknesses with target film thicknesses on subsequent layers to re-calculate synthetic ICE response and evaluate the analyte prediction error using a pre-determined NN algorithm. Accordingly, in some embodiments controller 350 performs a thickness adjustment as needed on the subsequent layers of the manufacturing ICE to ensure the performance of the produced ICE core within the tolerance of the optimized ICE model.

Figure 4:
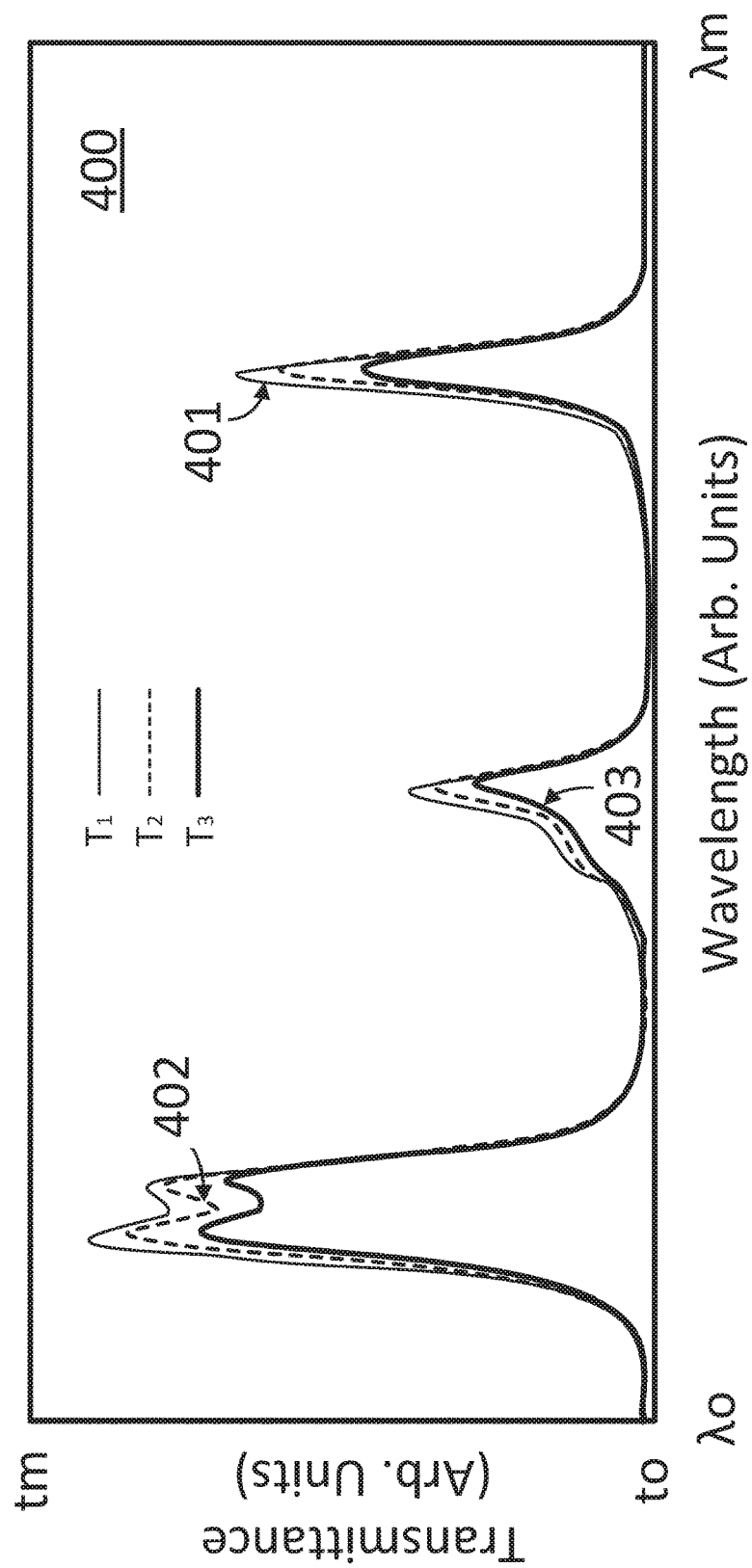
FIG. 4 is a chart illustrating the effect of temperature on the ICE transmittance spectrum.

FIG. 4 is a chart 400 illustrating the effect of temperature on the ICE transmittance spectrum. The abscissae in chart 400 indicate wavelength in arbitrary units, the wavelength range starting at a minimum wavelength $\lambda_o$ and ending at a maximum wavelength $\lambda_m$. The ordinates in chart 400 indicate a transmittance value in arbitrary units, the transmittance having a range starting at a minimum value to and ending at a maximum value tm. Transmittance curves 401, 402 and 403 indicate the transmittance of an exemplary ICE 100 such as illustrated in FIG. 2 above, for three different temperature values T1, T2, and T3, respectively. For illustrative purposes, the three setting temperatures are selected as T1=150° Fahrenheit (F), T2=200° F., and T3=250° F. As temperature increases, the overall light transmittance through ICE 100 decreases, and the transmittance spectrum slightly shifts toward higher wavelengths (to the right, in FIG. 4).

Methods for fabricating ICE 100 as disclosed herein incorporate temperature corrected optical properties to determine transmittance. Accordingly, transmittance curves 401, 402, and 403 and similar temperature corrected transmittance curves in an iterative method to determine the precise thickness of each dielectric layer 202 and 204 deposited on substrate 206 (cf. FIG. 2). The temperature dependence of the optical properties of the materials used in ICE 100 is the input to obtain transmittance curves 401, 402 and 403. Thus, when the performance of a candidate ICE design is evaluated against a calibration database including fluid data collected at a pre-determined temperature, methods as disclosed herein use the transmittance spectrum of the ICE design at the pre-determined temperature. This step enhances the potential to find ICE designs for analyte detection suitable for operation in a wide range of environmental conditions. In some embodiments, transmittance curves 401, 402, and 403 may also include corrections due to the temperature dependence of the optical properties of the material in substrate 206 of ICE 100. In embodiments where the material in substrate 206 is a glass such as BK7 and the like, the temperature dependence of the optical properties of substrate 206 may be very weak over the wavelength range of interest. In embodiments where the material in substrate 206 is Si or Ge, or any other semiconductor material or metal, the temperature dependence of the optical properties of substrate 206 may vary acutely and it is desirable to consider.

Figure 5:
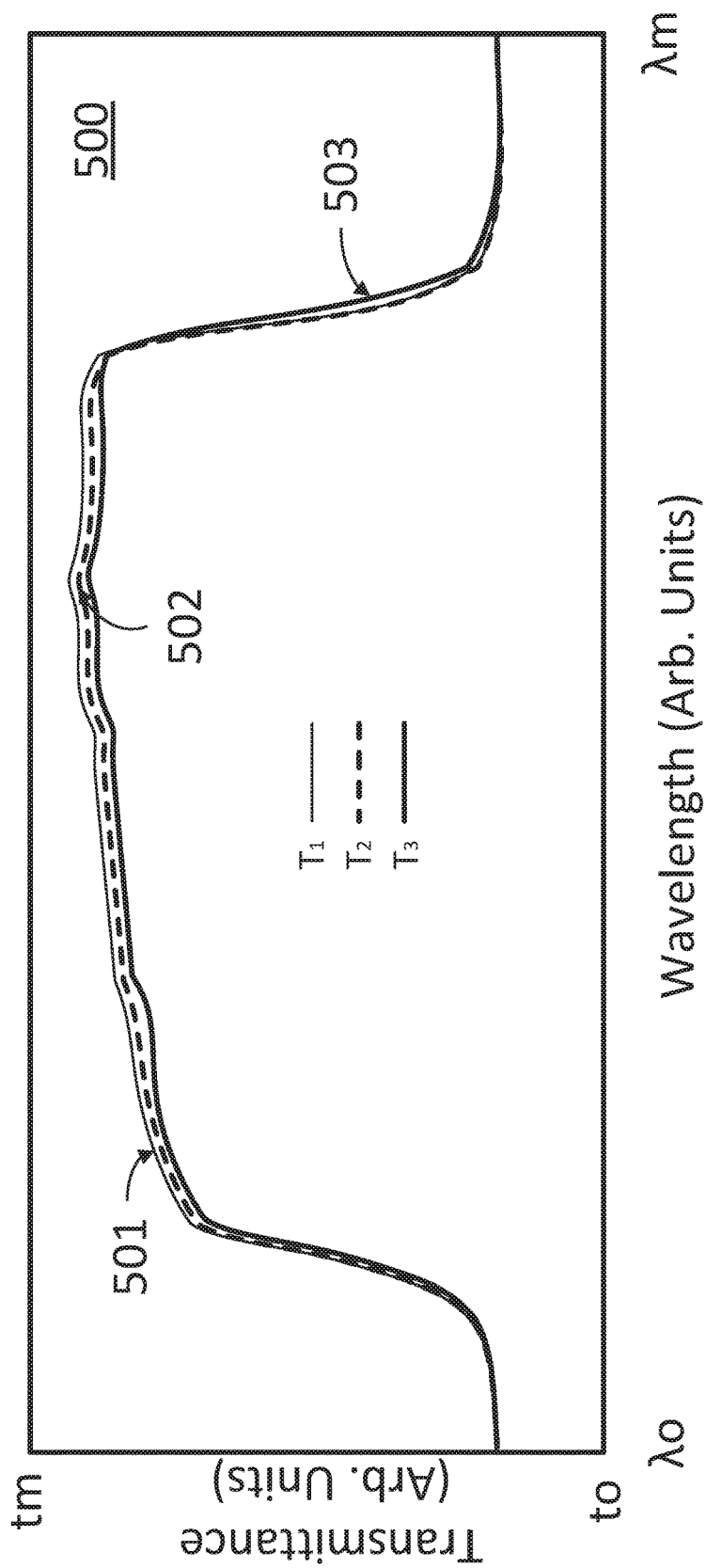
FIG. 5 is a chart illustrating the effect of temperature on a different component of an optical computing device.

FIG. 5 is a chart 500 illustrating the effect of temperature on different components of an optical computing device. The ordinates and abscissae in chart 500 are as described in detail above with regard to FIG. 4. Transmittance curves 501, 502, and 503 are transmittance curves for a generic optical computing device, such as a broad-band pass filter, obtained at each of the different temperatures T1, T2, and T3, respectively. One of ordinary skill recognizes that transmittance curves 501, 502, and 503 may correspond to any type of optical component in a downhole tool as disclosed herein, without loss of generality. Accordingly, methods for fabricating ICE 100 as disclosed herein may include a temperature transmittance analysis of optical components of an optical sensor other than ICE 100, as illustrated in FIG. 5. The temperature correction for any optical component can be performed by either using different temperature curves such as curves 501-503, or parameterizing measurement data as a function of temperature. In some embodiments, an adaptive temperature response adjustment for the optical system may be simulated and incorporated in the method for selecting a candidate ICE design that adequately accounts for temperature effects in the tool performance.

In embodiments consistent with the present disclosure, an ICE design and fabrication method incorporates design performance evaluation in an optimization loop to find candidate ICE designs suitable for fabrication. In some embodiments, a nonlinear algorithm may be used in the optimization loop to adjust ICE parameters according to environmental conditions corresponding to samples selected from a database. In some embodiments, the nonlinear algorithm is a neural networks algorithm including the environmental parameters themselves as input in addition to the simulated ICE response, thus achieving an improved analyte prediction by incorporating nonlinear environment correction with original ICE design. In some embodiments, the optical response of an ICE designed with respect to a specific fluid characteristic or analyte concentration is retained as the primary input in the nonlinear model through automatic candidate input selection during later calibration. Embodiments as disclosed herein substantially enhance the potential of a single ICE for wide-range analyte detection.

Figure 6:
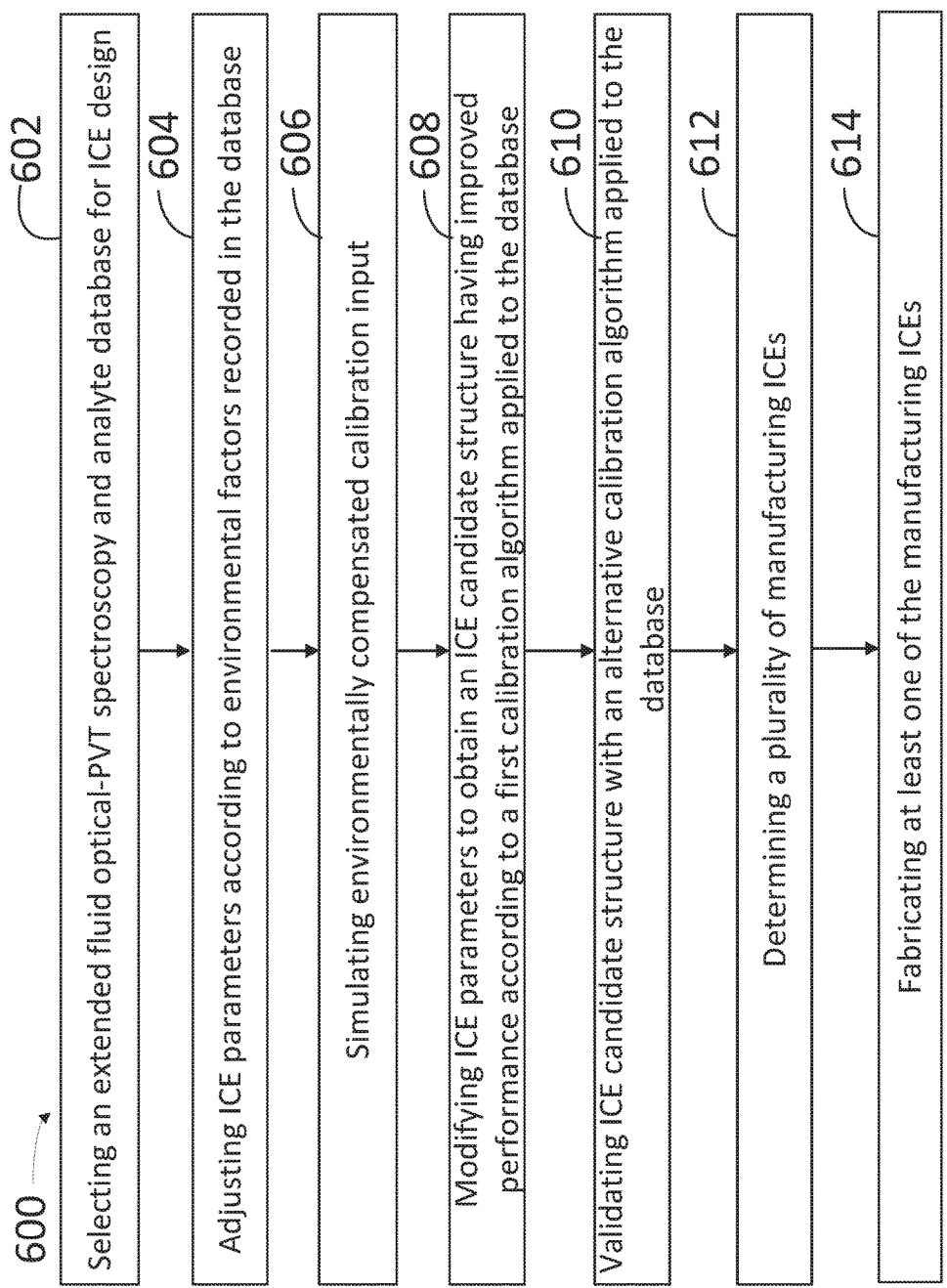
FIG. 6 illustrates a schematic flowchart describing a method for ruggedizing an ICE to measure a characteristic of a fluid.

FIG. 6 illustrates a schematic flowchart describing a method 600 for ruggedizing ICE design and fabrication to measure a characteristic of a fluid. An ICE according to methods consistent with method 600 may include a plurality of alternating dielectric layers of material deposited on a substrate (e.g., layers 202 and 204 over substrate 206, cf. FIG. 2). Furthermore, in embodiments consistent with the present disclosure method 600 may include using a chamber receiving a plurality of materials from supply containers through supply lines (e.g., chamber 300, supply containers 310, and supply lines 312, cf. FIG. 3), or any other source material delivery mechanism that is known in the art. In some embodiments, a controller device may perform at least some of the steps in method 600 upon execution by a processor in the controller of commands stored in a memory of the controller (e.g., controller 350, processor 351, and memory 352, cf. FIG. 3).

Methods consistent with the present disclosure may include at least some, but not all of the steps illustrated in method 600, performed in a different sequence. Furthermore, methods consistent with the present disclosure may include at least two or more steps as in method 600 performed overlapping in time, or almost simultaneously.

Step 602 includes selecting a database for ICE design. Step 602 uses all-type fluids, including light and medium oils, gas condensates, gas, heavy oils, water and multiphase mixtures, for NN embedded ICE design because of the capability of neural networks in dealing with complex nonlinear system. Calibration examples for analyte-specific ICE design can be expanded to an entire Optical-PVT database regardless of fluid type, making training data selection and model application generic and robust. An optical-PVT spectroscopy and analyte database as disclosed herein may include a plurality of optical-PVT data from light and medium oils, gas condensates, gas, heavy oils, water and multiphase mixtures.

Step 604 includes adjusting ICE parameters according to environmental factors recorded in the database. Fluid spectroscopy records in the database used for ICE design are measured as a function of fluid temperature, pressure and density in an Optical-PVT system. However, the refraction index of ICE materials and transmittance spectra of other optical system components are set at various constant conditions respectively for simplicity, which may cause additional inconsistency for potential application due to the difference between the simulated and actually measured ICE transmittance. Although post-regression analysis after fabrication can partially resolve the problem, environment matched design would significantly facilitate fluid modeling and data processing at the later phase of calibration.

Step 604 makes environmental correction on the data for design and experiments (DOE) by deploying temperature-dependent high and low refraction index constants of ICE materials first, making them consistent with measurement conditions of fluid spectroscopy and analyte in Optical-PVT database. Temperature correction can be performed by loading multiple sets of constants corresponding to the specified setting temperatures. The material index can also be parameterized as a function through simulation for adaptive constant adjustment.

Step 604 further makes temperature correction of system components within the ICE optical train such as optical filters, windows, and detectors. The optical response of the system components will be used in conjunction with synthetic ICE transmittance spectrum in simulating convolved system response, which is a better approximation for calculating ICE detector output. In some embodiments, step 604 includes using determined multiple sets of constants corresponding to the different setting temperatures. In some embodiments, step 604 includes parametrizing the temperature correction as a function through simulation for adaptive constant adjustment.

Step 604 further makes temperature correction of system components within the ICE optical train such as optical filters, windows, and detectors. The optical response of the system components will be used in conjunction with synthetic ICE transmittance spectrum in simulating convolved system response, which is a better approximation for calculating ICE detector output. In some embodiments, step 604 includes using the temperature compensated ICE refraction index and optical responses of system components to simulate candidate ICE transmittance spectra. In some embodiments, step 604 includes using the simulated candidate ICE spectra in conjunction with Optical-PVT fluid spectroscopy data to generate synthetic ICE detector responses as calibration inputs for candidate ICE designs.

Step 606 includes simulating an environmentally compensated calibration input. Step 606 includes using data of the temperature compensated ICE refraction index and optical responses of system components to simulate transmittance spectra of the candidate ICE designs. The simulated candidate ICE spectra are further multiplied with Optical-PVT fluid spectroscopy data as a dot product to represent synthetic ICE detector responses as calibration inputs for regression analysis and performance evaluation.

Step 608 includes modifying ICE parameters to obtain an ICE candidate structure having improved performance according to a first calibration algorithm applied to the database.

In some embodiments, step 608 includes determining a promising candidate ICE designs in a regression and optimization loop spanned over various film structures with different layers. Given the ICE structure with specified film thickness for each layer, the design performance is evaluated with neural network regression analysis. Step 608 may include optimizing the ICE structure and film thickness for each layer through evolutionary computation (genetic algorithm) or other gradient decent based algorithms. Step 608 may include spanning candidate ICE designs over various film structures with different layers. The film thickness for each layer is optimized through evolutionary computation or other gradient decent based algorithms with design performance evaluated using neural network regression analysis. In some embodiments, the neural network regression analysis uses simulated detector response from a single candidate ICE as primary input parameter, and calibration fluid spectroscopy specified temperature, pressure and density measurements as additional input parameters. In some embodiments, the neural network regression analysis deploys regularization, validated early stopping and network committee techniques to reduce the uncertainty of ICE design performance evaluation.

Step 610 includes validating the ICE candidate structure with an alternative calibration algorithm applied to the database. In some embodiments, step 610 includes comparing the performance of NN embedded ICE designs with performance of same designs evaluated using other optional calibration algorithms such as linear regression and second-order polynomial regression analysis for potential applications. Potential applications include optional post-calibration of optical sensor with Partial-Least-Square (PLS) algorithm after element fabrication. Therefore, it is desirable to determine the best promising design, which is a compromise in resulting performance between using non-linear and linear calibration algorithm to minimize analyte prediction error. Step 610 may include ranking the candidate ICE designs with neural network performance evaluation, and validating the candidate ICE structure includes evaluating design performance with different calibration algorithms such as linear and high-order polynomial based regression analysis to facilitate other potential applications.

Step 612 includes determining a plurality of manufacturing ICEs. In some embodiments, step 612 includes selecting fabrication candidates from the NN-based candidate designs having the best trade-off in performance evaluated with neural network, linear, and polynomial data mapping algorithms. Step 614 includes fabricating at least one of the manufacturing ICEs. In some embodiments, step 614 may include measuring a thickness of a deposited layer during fabrication, and incorporating the measured layer thickness with target film thicknesses on subsequent layers of the manufacturing ICE in a fluid prediction model to predict the performance of fabricated ICE resulting from fabrication of the selected manufacturing ICE. Accordingly, in some embodiments step 614 may include adjusting a thickness on a subsequent layer of the manufacturing ICE to ensure the performance of the produced ICE core within the tolerance of the optimized ICE model. Consistent with embodiments disclosed herein, the fluid prediction model used in fabrication step 614 may include a neural network (NN) algorithm as described herein.

Figure 7:
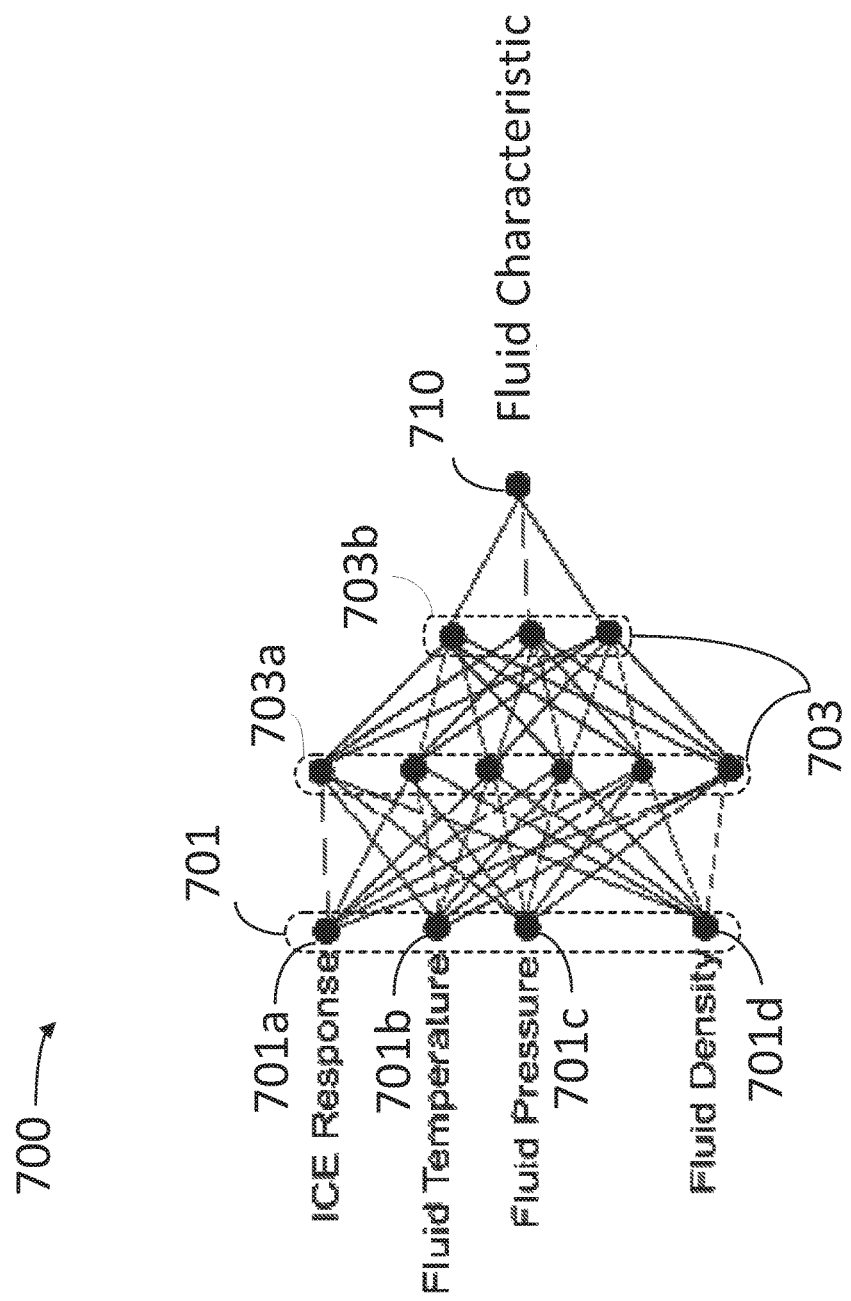
FIG. 7 illustrates a neural network algorithm to obtain a characteristic of a fluid using an ICE response and environmental factors for design performance evaluation.

FIG. 7 is a schematic diagram of an NN algorithm 700 to obtain a fluid characteristic 710 using an ICE response 701$a$ and environmental factors such as a fluid temperature 701$b$, a fluid pressure 701$c$, and a fluid density 701$d$ (hereinafter collectively referred to as material factors 701). NN algorithm 700 includes hidden layers 703 with each hidden nodes implemented with a nonlinear transfer function (e.g., hyperbolic tangent sigmoid, or logarithmic sigmoid). The net input of each hidden node on a first hidden layer 703$a$ is a weighted linear combination of all calibration inputs according the node connection. After the net input is received at each hidden node, NN algorithm 700 calculates net output using the equipped nonlinear transfer function. The net output of first hidden layer 703$a$ at each node is then fed as input into the nodes on a second hidden layer 703$b$. The single node on an output layer 710 can be implemented with either a linear transfer function or nonlinear transfer function. In some embodiments, output node fluid characteristic 710 may be a weighted linear combination, receiving inputs from outputs of the second hidden layer 703$b$.

NN algorithm 700 uses more model parameters and a non-linear transfer function on hidden layers to identify complex systems with different types of fluids. The number of hidden layers and nodes are flexible depending on the complexity of relationship between the system inputs and output. NN algorithm 700 has the capability of finding the best candidate ICE designs for general analyte detection based on the information of an entire calibration database. Accordingly, NN algorithm 700 may be implemented with a single ICE 100 for a wide range of environmental conditions and fluid types.

NN algorithm 700 uses primary regression parameters such as single ICE response 701$a$, fluid temperature 701$b$, fluid pressure 701$c$ and fluid density 701$d$ as inputs, while fluid characteristic 710 (e.g., a target analyte concentration) is used as calibration output. There is no limitation to adjust hidden-layers 703 and architecture in the embodiments. Although multi-objective function may be chosen for design performance evaluation, a simple root-of-mean-squared error based performance measure would apply when all-type fluid data are integrated into calibration data set. In this case, the model that produces an adequate prediction over diverse fluid samples could be a model with desired signal sensitivity, reasonable percentage of ICE transmittance, and larger signal to noise ratio. To make neural network regression analysis robust, advanced training with regularization, validated early stopping and network committee may reduce the uncertainty of ICE design performance evaluation.

Figure 8:
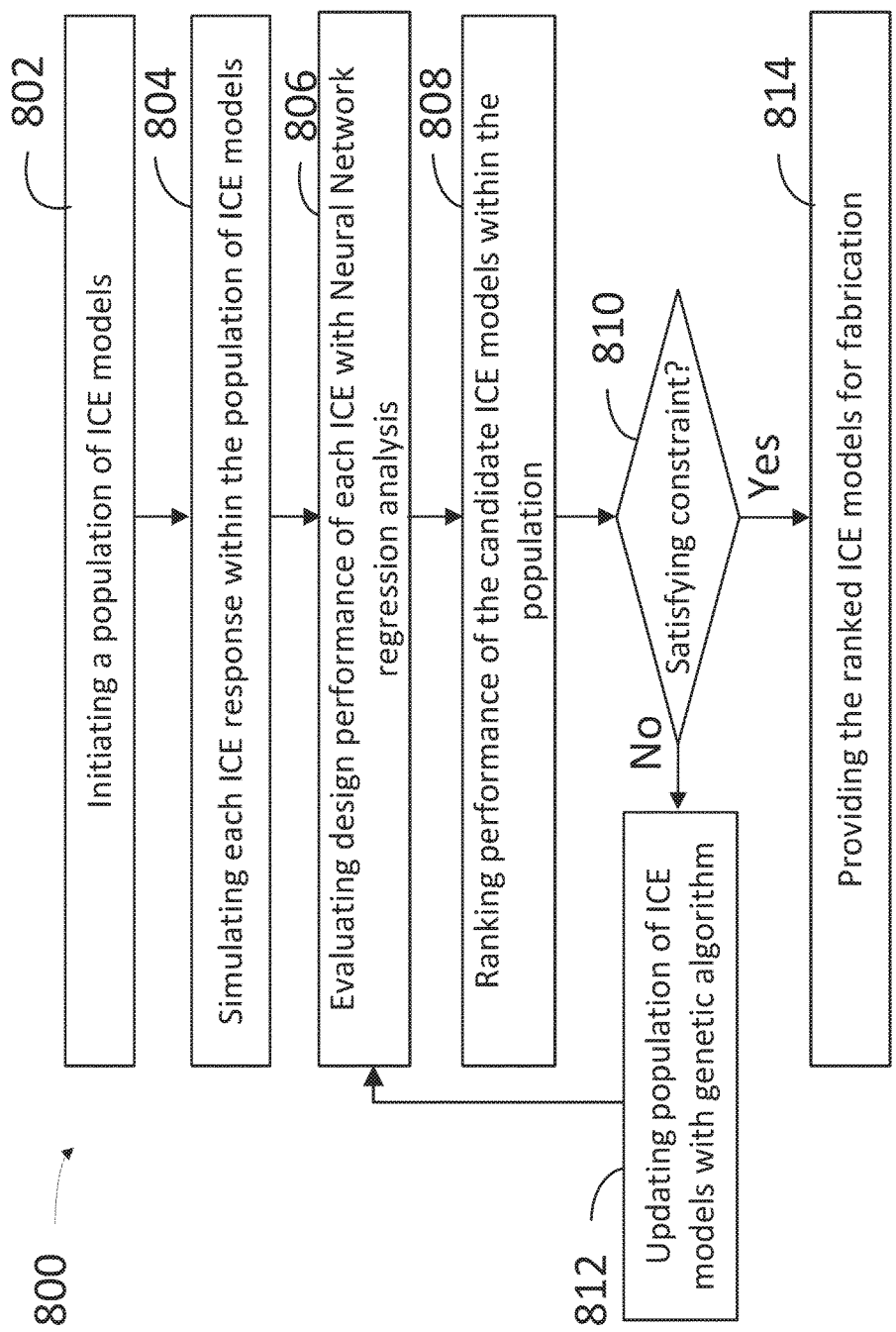
FIG. 8 illustrates a schematic flowchart of a method for optimizing candidate ICE structures with different layers and film thicknesses.

FIG. 8 illustrates a schematic flowchart of a method 800 for optimizing ICE structures with variable layers and film thickness and providing ranked candidate designs by using genetic algorithm (GA) as a search engine and neural network (NN) as a calibration tool for performance evaluation. GA is a stochastic global search engine that mimics the metaphor of natural biologic evolution. As a computational intelligent method, GA operates on a population of potential solutions applying the principle of survival of the fittest to produce improved solutions through multiple generations. At each generation, the fitness of each individual is evaluated based on the user defined objective function, and an updated population of solutions is created by using genetic operators such as ranking, selection, crossover and mutation. This evolutionary computation approach eliminates the need to calculate the first derivative and/or the second derivative in conventional optimization methods and is best suitable to solve complex problem such as the application in ICE design optimization. An ICE according to methods consistent with method 800 may include a plurality of alternating dielectric layers of material deposited on a substrate (e.g., layers 202 and 204 over substrate 206, cf. FIG. 2). Furthermore, embodiments used to fabricate the optimized ICE design consistent with method 800 may include using a chamber receiving a plurality of materials from supply containers through supply lines (e.g., chamber 300, supply containers 310, and supply lines 312, cf. FIG. 3), or any other source material delivery mechanism that is known in the art. In some embodiments, a controller device may perform at least some of the steps in method 800 upon execution by a processor in the controller of commands stored in a memory of the controller (e.g., controller 350, processor 351, and memory 352, cf. FIG. 3).

Methods consistent with the present disclosure may include at least some, but not all of the steps illustrated in method 800, performed in a different sequence. Furthermore, methods consistent with the present disclosure may include at least two or more steps as in method 800 performed overlapping in time, or almost simultaneously.

Step 802 includes initiating a population of ICE model at the design stage. Accordingly, step 802 may include randomly initiating each film thickness (from 50 to 1200 nanometers, for example) for each ICE structure with fixed number of layers (from 4 to 17, for example). Step 802 also includes setting film thickness of each layer as individual design parameter to be optimized for the given structure, and defining each design parameter as a binary string, called chromosome, with expected resolution over the dynamic range of each parameter. Step 804 includes simulating each ICE response within the population of ICE models with environment correction. Step 806 includes evaluating design performance of each ICE with a nonlinear regression analysis. In some embodiments, step 806 includes performing a NN regression analysis.

Step 808 includes ranking the performance of candidate ICE models within the population. In some embodiments, step 808 may include evaluating standard error of calibration (SEC) for candidate ICE designs. The resulting SEC for each ICE model is indicative of how good of a particular ICE predictor will be for the analyte of interest. The ranking results will also be used by the GA in step 812 by selecting top 70 to 80 percent of candidate designs in initial population for genetic operation to get upgraded ICE population design in the second generation.

Step 810 includes a query of whether or not the higher ranking candidate ICE structures satisfy a pre-determined constraint. Without prior knowledge about what SEC is realistic to achieve with a given ICE model, a maximum number of generations with GA may be a constraint or stop criterion for method 800 in step 810. Before reaching the stop criterion, GA algorithm updates the population ICE models in multiple iterations by applying genetic operators such as selection, crossover, and mutation to the parameter chromosome in step 812, repeating method 800 from step 806 until the constraint is satisfied in step 810. The optimization process terminates and moves to step 814 after reaching a stop criterion (i.e., a constraint is satisfied in step 810). Final ranking in step 814 includes determining the most promising ICE models through fabrication feasibility examination, multi-objective performance evaluation, and validation testing by using alternative calibration algorithms. The top resulting ICE models through step 814 are selected as manufacturing ICEs for fabrication. Although the optimization method in this example is implemented with evolutionary computation, there is no limitation to use other optimization algorithms such as gradient decent based or Newton (second derivative based) method.

Figure 9:
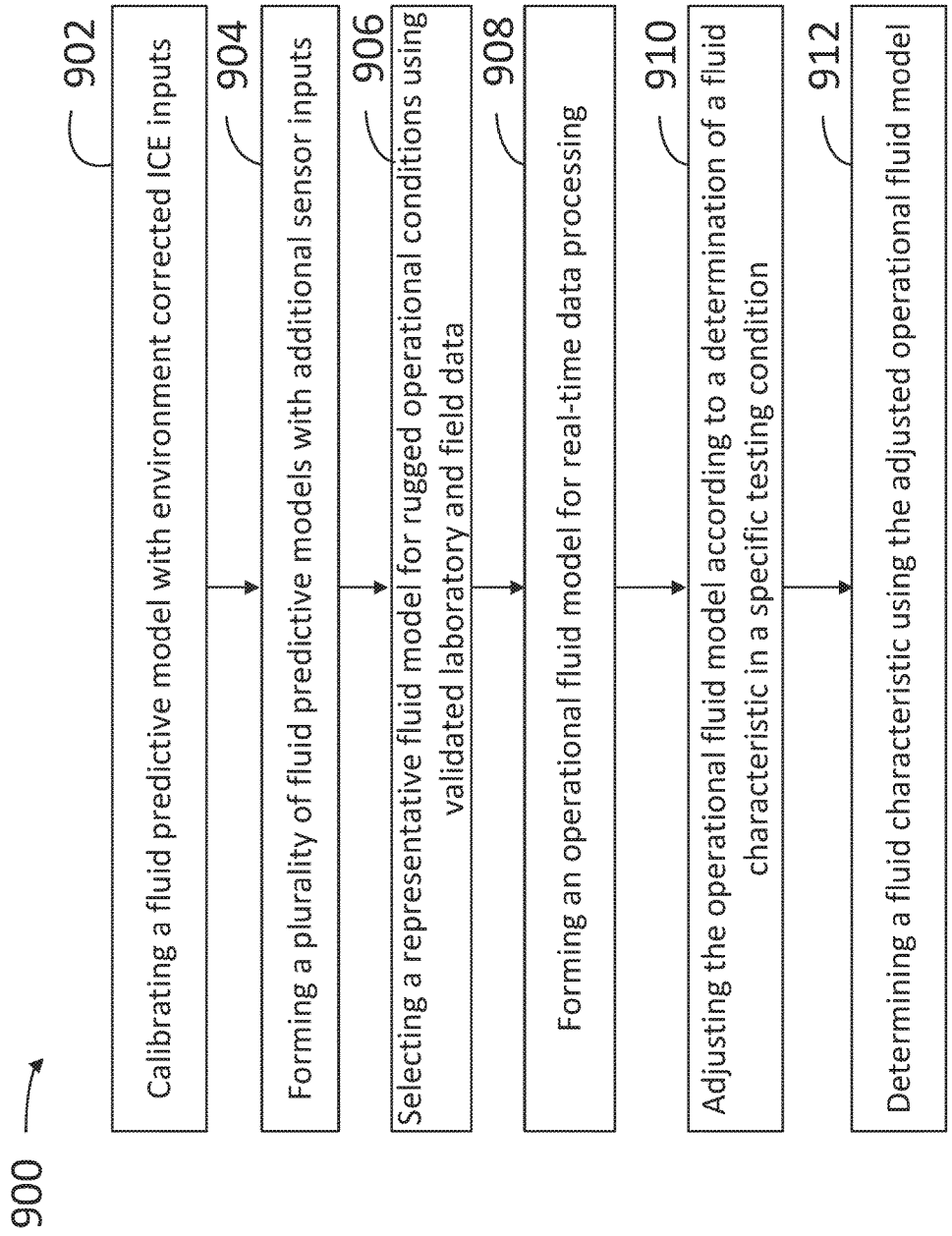
FIG. 9 illustrates a schematic flowchart for a method of deploying an ICE for optical fluid analysis and characterization.

FIG. 9 illustrates a schematic flowchart for a method 900 of deploying an ICE for optical fluid analysis and characterization. An ICE according to methods consistent with method 900 may include a plurality of alternating dielectric layers of material deposited on a substrate (e.g., layers 202 and 204 over substrate 206, cf. FIG. 2). Furthermore, embodiments used to fabricate the optimized ICE design consistent with the present disclosure method 900 may include using a chamber receiving a plurality of materials from supply containers and through supply lines (e.g., chamber 300, supply containers 310, and supply lines 312, cf. FIG. 3), or any other source material delivery mechanism that is known in the art. In some embodiments, a controller device may perform at least some of the steps in method 900 upon execution by a processor in the controller of commands stored in a memory of the controller (e.g., controller 350, processor 351, and memory 352, cf. FIG. 3).

Methods consistent with the present disclosure may include at least some, but not all of the steps illustrated in method 900, performed in a different sequence. Furthermore, methods consistent with the present disclosure may include at least two or more steps as in method 900 performed overlapping in time, or almost simultaneously.

Step 902 includes calibrating a fluid predictive model with environment corrected ICE inputs. In some embodiments, step 902 includes calibrating an analyte-specific fluid predictive model with inputs from a fabricated ICE. In some embodiments, step 902 may include calibrating an analyte detection model using the entire calibration database. Further, according to some embodiments, step 902 may include calibrating a fluid predictive model with use of selected samples. Step 902 may include using neural networks to correct the difference between the simulated and measured ICE response with respect to the analyte detection through re-calibration. The measured ICE transmittance spectra after fabrication at elevated temperatures are incorporated into calculation of synthetic ICE responses, which are used in conjunction with fluid environment parameters as primary calibration inputs as shown in FIG. 7.

Step 904 includes forming a plurality of fluid predictive models with additional sensor inputs. In some embodiments, step 904 includes calibrating more candidate fluid models for same analyte detection. In some embodiments, step 904 includes selecting the additional sensor inputs from other available optical elements to be installed with manufactured ICE core on the same sensor in a downhole tool. Step 904 may include using optical responses measured from other optical elements of the sensor as additional calibration parameters with neural networks, and building candidate predictive models through forward stepwise input selection to improve analyte estimation.

Step 906 includes selecting a representative fluid model for rugged operational conditions using validated laboratory and field data. In some embodiments, step 906 includes selecting a single candidate fluid model, or an ensemble of candidate models for rugged operational conditions using validated laboratory and field data. In some embodiments, step 906 includes using available laboratory data and/or field data with known results to validate model prediction through cross-space transformation with same sensor or cross-sensor transformation between different sensors.

Step 908 includes forming an operational fluid model for real-time data processing with a single neural network or neural network ensemble. In some embodiments, step 908 includes forming an operational fluid model for real-time data processing with inputs from primary ICE response and environmental parameters consistent to original ICE design. In some embodiments, step 908 includes forming an operational fluid model with inputs determined from a post-calibration procedure with the ICE design and additional elements of the optical sensor, and performing real-time optical data analysis for estimating fluid compositions and properties during field operations of drilling and/or well testing and sampling.

Step 910 includes adjusting the operational fluid model according to a determination of a fluid characteristic in a specific testing condition. In some embodiments, step 910 may further include determining a fluid characteristic using adaptively updated operational fluid model with different candidate inputs. Step 910 also includes optimizing decision making from optical data analysis applied to wireline and/or LWD well testing and sampling. In some embodiments, step 910 may include adjusting system parameters during the job operations according to a particular estimated fluid property, and providing solutions on complete fluid answer products at an optimized testing condition. Step 912 includes determining a fluid characteristic using the adjusted operational fluid model. In some embodiments, step 912 includes determining a fluid characteristic using the adjusted operational fluid model through real-time or post processing.

Figure 10:
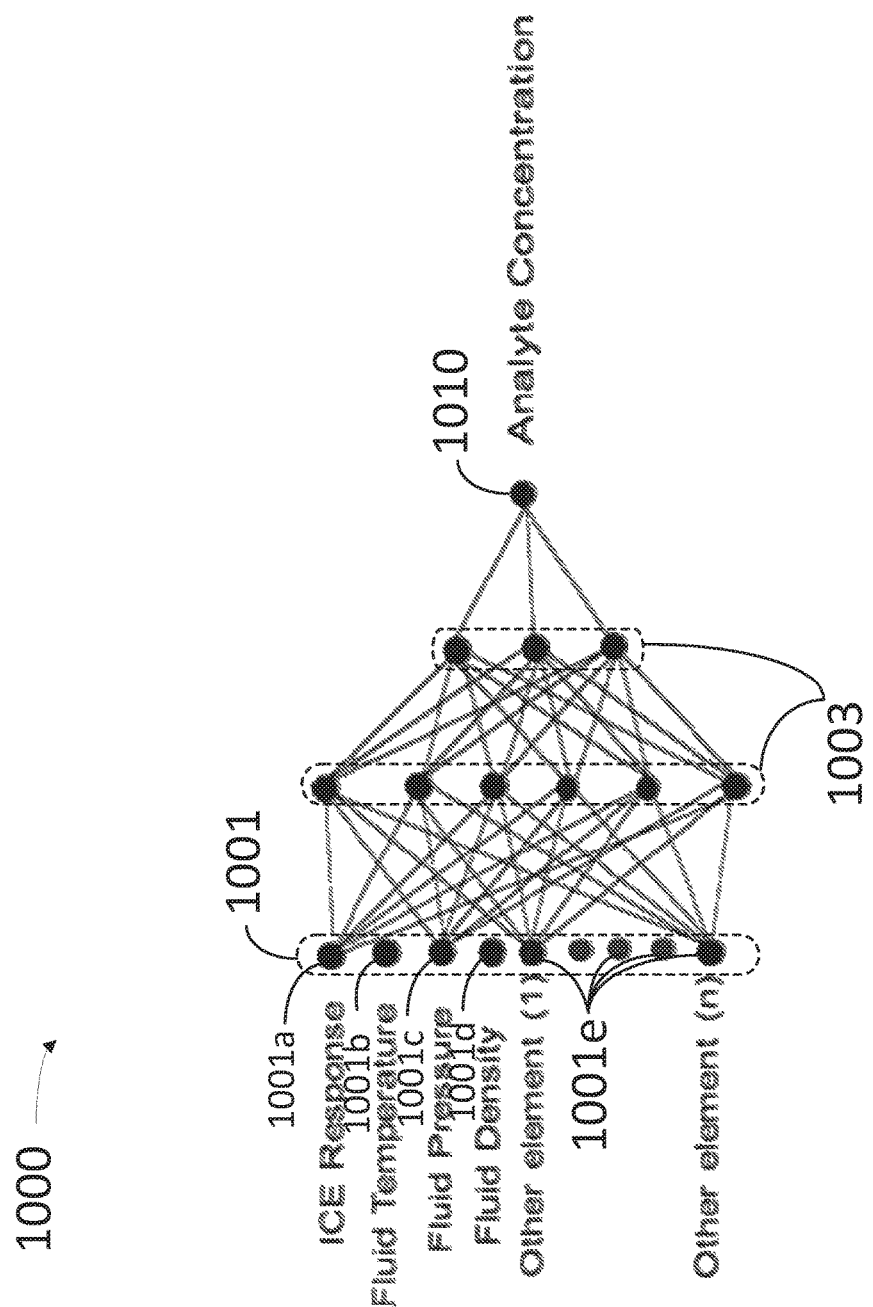
FIG. 10 illustrates a neural network algorithm to obtain a characteristic of a fluid using an ICE response and environmental factors, and supplemental factors.

FIG. 10 illustrates a representative neural network algorithm 1000 to obtain a fluid characteristic 1010 using multivariate calibration inputs available in optical sensor or downhole optical tool. Calibration inputs 1001 may include analyte-specific ICE response $1001a$, environmental conditioning such as fluid temperature $1001b$, fluid pressure $1001c$, and fluid density $1001d$, and supplemental inputs $1001e$. Same multi-layer feedforward neural network structure and transfer functions as defined in NN algorithm 700 can be applied to NN algorithm 1000.

NN algorithm 1000 can be implemented into a multi-member model base through an automatic input selection and calibration routine and used as an ensemble or "committee predictor" in application according to some embodiments. The first member network or candidate model, for example, can be formed using four primary inputs consistent with analyte-specific ICE design, namely: ICE response 1001*a*, fluid temperature 1001*b*, fluid pressure 1001*c*, and fluid density 1001*d*. A second member network or candidate model includes one more supplemental calibration inputs 1001*e*. In some embodiments, supplemental calibration input 1001*e* is selected through a forward stepwise input selection and may include five inputs in total. A third member network or candidate model may include two additional supplemental calibration inputs 1001*e* to make six inputs in total, and so on. In some embodiments, supplemental calibration inputs 1001*e* are added to the NN model incrementally by including the most significant inputs that contribute to SEC reduction most effectively. Additional inputs 1001*e* may include optical sensor responses generated by other elements such as ICE cores with different structures designed for generic analyte detection or NBP filters. Accordingly, the significance of additional input factors 1001*e* is evaluated in each optimization loop of input selection with a calibration database.

In some embodiments, NN algorithm 1000 may be designed to selectively include analyte-specific ICE core and other environment parameters as primary inputs to retain all effort on ICE design optimization and fabrication. A backward stepwise input selection may be used to determine the inputs for NN algorithm 1000. The backward stepwise input selection starts with all available inputs and removes the least significant element in each iteration. This algorithm may exclude a desired ICE model from the calibration inputs in NN algorithm 1000 when a less than optimal design and fabrication ICE model is used. A forward stepwise input selection applied to NN algorithm 1000 ensures that the ruggedized ICE response is included in calibration even with use of a small number of inputs. In some embodiments, NN algorithm 1000 can also be built with backward stepwise input selection applied to supplemental sets 1001*e* only, keeping inputs 1001*a* to 1001*d* as existing primary regression parameters. The least significant or most significant attributes associated with backward or forward stepwise input selection may be selected according to multiple criteria. For example, in some embodiments the selection criteria may be based on a performance ranking of overall root mean-squared (RMS) error averaged over a pre-selected number of NNs, for a plurality of calibration inputs and sample points.

In some embodiments, NN algorithm 1000 is trained wherein ICE response factor 1001*a* is emphasized over other optical elements included in additional input factors 1001*e*. In such embodiments, it is desirable to have ICE design, fabrication, and post-calibration procedures as outlined above using a NN algorithm that is at least similar to the general framework of NN algorithm 1000 (e.g., methods 600, 800, and 900, cf. FIGS. 6, 8, and 9). Due to its computation power in solving complicated nonlinear problem, NN algorithm 1000 arrives to fluid characteristic estimate much accurate as compared to a linear model under harsh conditions. It is also more efficient than linear models in real-time data analysis with the capability of universal function approximation regardless of fluid type. Moreover, NN algorithm 1000 as disclosed herein may outperform high-order polynomial and other non-linear models in downhole optical fluid identification because of its flexibility in model architecture and training algorithm.

Figure 11:
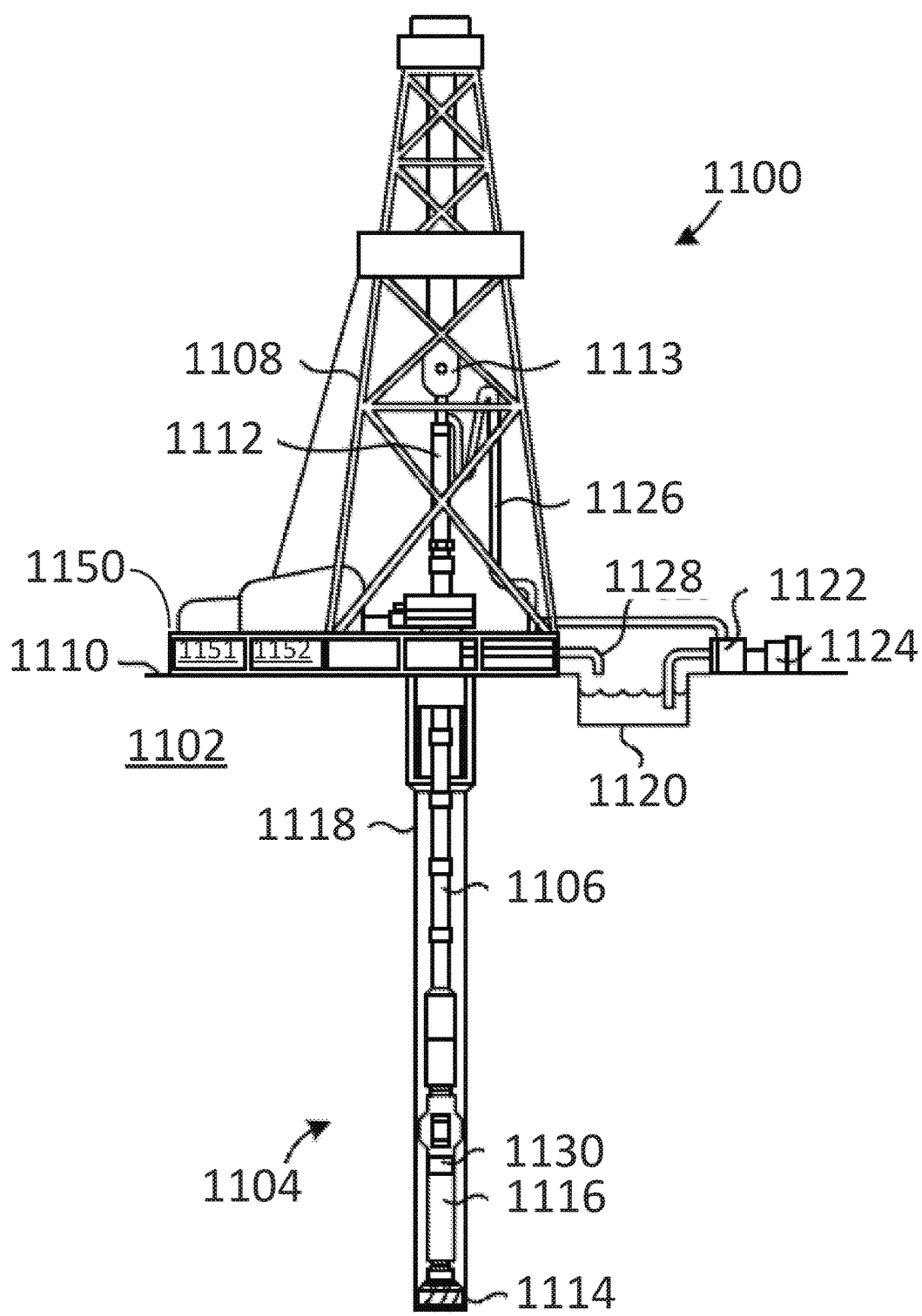
FIG. 11 is a drilling system configured to use a calibrated optical sensor for modifying a drilling parameter or configuration in measurement-while-drilling (MWD) and logging-while-drilling (LWD) operations.

FIG. 11 is a drilling system 1100 configured to use an optical computing device for modifying a drilling parameter or configuration in a measurement-while-drilling (MWD) and a logging-while-drilling (LWD) operations. Boreholes may be created by drilling into the earth 1102 using the drilling system 1100. Drilling system 1100 may be configured to drive a bottom hole assembly (BHA) 1104 positioned or otherwise arranged at the bottom of a drill string 1106 extended into the earth 1102 from a derrick 1108 arranged at the surface 1110. The derrick 1108 includes a Kelly 1112 and a traveling block 1113 used to lower and raise the Kelly 1112 and the drill string 1106.

The BHA 1104 may include a drill bit 1114 operatively coupled to a tool string 1116 which may be moved axially within a drilled wellbore 1118 as attached to the drill string 1106. During operation, drill bit 1114 penetrates the earth 1102 and thereby creates the wellbore 1118. The BHA 1104 provides directional control of the drill bit 1114 as it advances into the earth 1102. The tool string 1116 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 1116, as shown in FIG. 11.

Fluid or "mud" from a mud tank 1120 may be pumped downhole using a mud pump 1122 powered by an adjacent power source, such as a prime mover or motor 1124. The mud may be pumped from the mud tank 1120, through a stand pipe 1126, which feeds the mud into the drill string 1106 and conveys the same to the drill bit 1114. The mud exits one or more nozzles arranged in the drill bit 1114 and in the process cools the drill bit 1114. After exiting the drill bit 1114, the mud circulates back to the surface 1110 via the annulus defined between the wellbore 1118 and the drill string 1106, and in the process, returns drill cuttings and debris to the surface. The cuttings and mud mixture are passed through a flow line 1128 and are processed such that a cleaned mud is returned down hole through the stand pipe 1126 once again. A computer 1150 on surface 1110 including a processor 1151 and a memory 1152 may communicate with downhole tool 1130 and execute methods to control downhole tool 1130, as disclosed herein.

The BHA 1104 may further include a downhole tool 1130 that may be similar to the downhole tools described herein. More particularly, the downhole tool 1130 may have a calibrated optical sensor arranged therein, and the downhole tool 1130 may have been calibrated prior to being introduced into the wellbore 1118 using the sensor validation testing generally described herein. Moreover, prior to being introduced into the wellbore 1118, the downhole tool 1130 may have been optimized by generally applying a fluid model based on a nonlinear algorithm such as illustrated in NN 700 or in NN 1000 (cf. FIGS. 7 and 10, respectively). Drilling system 1100 may also include a controller 1150 having a processor 1151 and a memory 1152. Accordingly, memory 1152 may store instructions and commands which, when executed by processor 1151, cause controller 1150 to direct drilling system 1100 to perform at least partially a method including steps consistent with method 900 (cf. FIG. 9).

Figure 12:
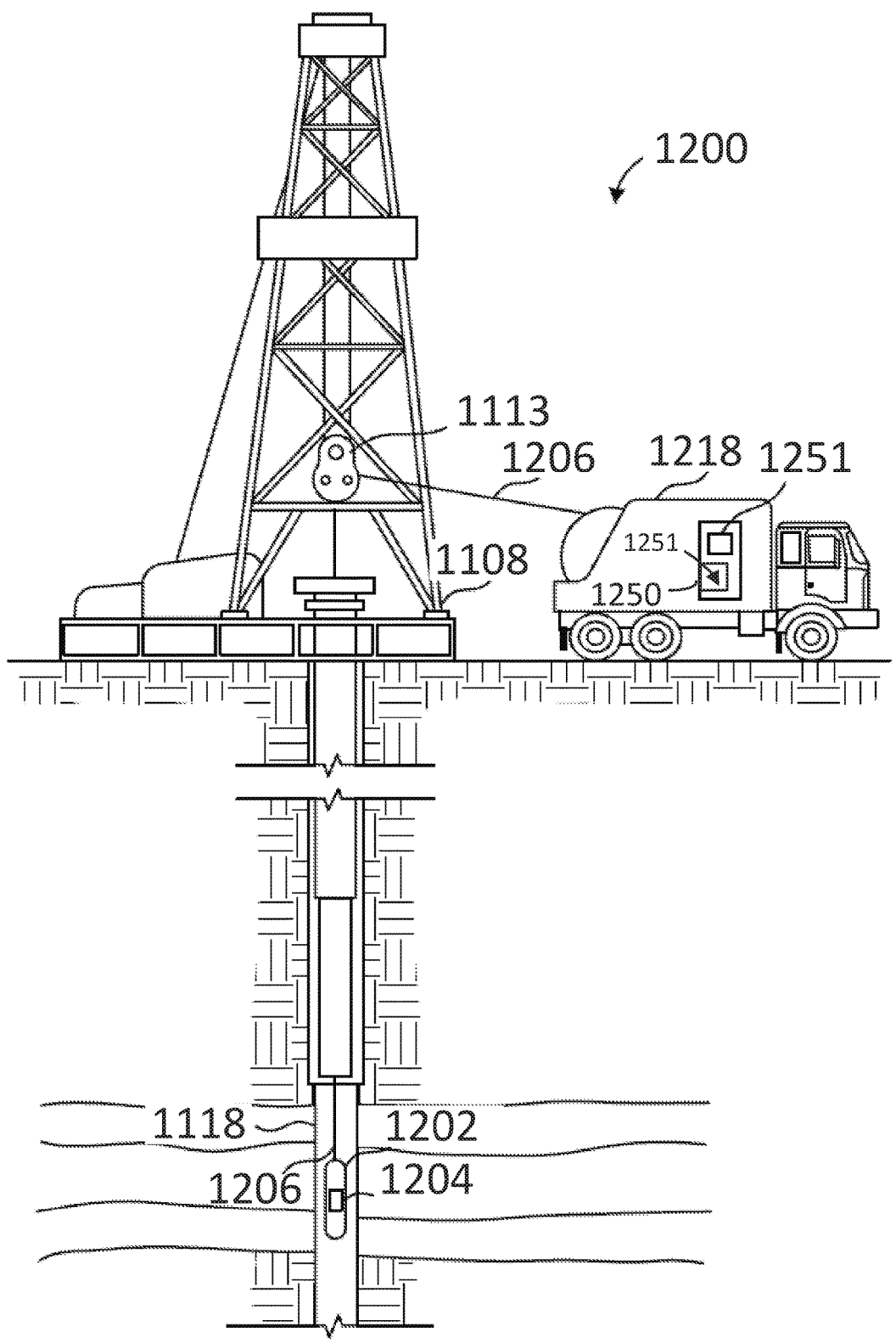
FIG. 12 is a wireline system configured to use a calibrated optical sensor during formation testing and sampling.

FIG. 12 is a wireline system 1200 configured to use a calibrated optical sensor during formation testing and sampling. In some embodiments, wireline system 1200 may be configured to use a calibrated optical sensor during formation testing and sampling. After drilling of wellbore 1118 is complete, it may be desirable to know more details of types of formation fluids and the associated characteristics through sampling with use of wireline formation tester. System 1200 may include a downhole tool 1202 that forms part of a wireline logging operation that can include one or more optical sensors 1204, as described herein, as part of a downhole measurement tool. System 1200 may include the derrick 1108 that supports the traveling block 1113. Wireline logging tool 1202, such as a probe or sonde, may be lowered by wireline or logging cable 1206 into wellbore 1118. Sensors in downhole tool 1202 may be lowered to the bottom of the region of interest and subsequently pulled upward at a substantially constant speed. Sensor 1202 may be configured to measure fluid properties of the wellbore fluids, and any measurement data generated by downhole tool 1202 and its associated optical sensors 1204 can be communicated to a surface logging facility 1218 for storage, processing, and/or analysis. Logging facility 1218 may be provided with controller 1250, including processor 1251 and memory 1252. Accordingly, memory 1252 may store instructions and commands which, when executed by processor 1251, cause controller 1250 to direct wireline system 1200 to perform at least partially a method including steps consistent with method 900 (cf. FIG. 9).

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of I, II, and III" or "at least one of I, II, or III" each refer to only I, only II, or only III; any combination of I, II, and III; and/or at least one of each of I, II, and III.

Embodiments disclosed herein include:

A. A method, including selecting a database for integrated computational element (ICE) design and adjusting a plurality of ICE operational parameters according to an environmental factor recorded in the database. The method further includes simulating environmentally compensated calibration inputs, modifying a plurality of ICE structure parameters to obtain an ICE candidate structure having improved performance according to a first algorithm applied to the database, and validating the ICE candidate structure with an alternative algorithm applied to the database. In some embodiments, the method includes determining a plurality of manufacturing ICEs based on the validation with the first algorithm and the alternative algorithm and fabricating one of the plurality of manufacturing ICEs.

B. A method, including calibrating a fluid predictive model with an environment corrected integrated computational element (ICE) and forming a plurality of fluid predictive models with additional inputs selected from an available sensor in a downhole tool. The method further includes selecting a representative fluid model for a rugged operational condition using validated laboratory and field data, forming an operational fluid model for real-time data processing, and adjusting the operational fluid model according to a determination of a fluid characteristic in a specific testing condition. In some embodiments, the method further includes determining a fluid characteristic using the adjusted operational fluid model, wherein the operational fluid model includes a nonlinear neural network including an input from the environment corrected ICE and at least one additional input.

C. A non-transitory, computer readable medium storing commands which, when executed by a processor in a controller, cause the controller to perform a method including selecting a database for integrated computational element (ICE) design, and adjusting a plurality of ICE operational parameters according to an environmental factor recorded in the database. The method includes simulating environmentally compensated calibration inputs, modifying a plurality of ICE structure parameters to obtain an ICE candidate structure having improved performance according to a first algorithm applied to the database, validating the ICE candidate structure with an alternative algorithm applied to the database, and determining a plurality of manufacturing ICEs based on the validation with the first algorithm and the alternative algorithm. In some embodiments, the method further includes fabricating one of the plurality of manufacturing ICEs.

Each of embodiments A and B may have one or more of the following additional elements in any combination: Element 1: wherein modifying the plurality of ICE structure parameters includes at least one of modifying a number of layers of material in the ICE candidate structure or modifying a thickness of an existing layer of material in the ICE candidate structure. Element 2: wherein validating the ICE candidate structure includes estimating at least one of a standard error of prediction (SEP), a standard error of calibration (SEC), a variance, a sensitivity and a specificity value associated with the ICE candidate structure. Element 3: wherein validating the ICE candidate structure includes using an algorithm selected from one of a neural network model, a linear model, or a polynomial model relating tool input to the fluid characteristic of interest. Element 4: wherein selecting the database includes selecting an optical-PVT spectroscopy and analyte database including a plurality of optical-PVT data from light and medium oils, gas condensates, gas, heavy oils, water and multiphase mixtures. Element 5: wherein adjusting the plurality of ICE operational parameters according to an environmental factor includes a temperature correction of high and low refraction index constants of ICE materials in simulating an ICE response complying with an environmental condition of at least one of a fluid spectroscopy and an analyte in the database. Element 6: wherein adjusting the plurality of ICE operational parameters according to an environmental factor includes a temperature correction of a substrate material in simulating an ICE response complying with an environmental condition of at least one of a fluid spectroscopy and an analyte in the database. Element 7: wherein adjusting the plurality of ICE operational parameters according to environmental factors further includes correcting a temperature effect on an optical response of at least one of an optical filter, a window and a detector related to an ICE response. Element 8: wherein adjusting the ICE operational parameters according to an environmental factor includes measuring fabricated ICE transmittance spectra under different temperature settings. Element 9: wherein the validating the ICE candidate structure with an alternative algorithm includes using at least one of a neural network algorithm, a linear algorithm, and a polynomial data mapping algorithm. Element 10: wherein fabricating one of the plurality of manufacturing ICEs further includes: measuring a thickness of a deposited layer, incorporating the measured layer thickness with a plurality of target film thicknesses on subsequent layers of the one of the plurality of manufacturing ICEs in a fluid prediction model to predict a performance of an ICE being fabricated, and adjusting a thickness on a subsequent layer of the manufacturing ICE according to the predicted performance of the ICE being fabricated.

Element 11: wherein calibrating a fluid predictive model with inputs from the environment corrected ICE includes selecting the ICE with a neural network algorithm that incorporates simulated ICE transmittance spectra at elevated temperatures, and also incorporates fluid environment parameters as calibration inputs. Element 12: wherein the additional inputs include at least one optical response from a sensor element other than the environment corrected ICE. Element 13: wherein selecting a representative fluid model includes using available laboratory data and/or field data with known results for validating a fluid model prediction, and wherein the validating the fluid model prediction includes at least one of transforming data between a plurality of ICE devices in a downhole tool or transforming data between a plurality of ICE devices in a plurality of downhole tools. Element 14: wherein decision making from optical data analysis applied to wireline and logging-while-drilling (LWD) well testing and sampling includes adjusting system parameters during the job operations according to a particular estimated fluid property.

Element 15: wherein the commands for modifying a plurality of ICE structure parameters include commands for at least one of modifying a number of layers of material in the ICE structure or modifying a thickness of an existing layer of material in the ICE structure. Element 16: wherein commands for validating the ICE candidate structure include commands for estimating at least one of a standard error of prediction (SEP) a standard error of calibration (SEC), a variance, a sensitivity and a specificity value associated with the ICE candidate structure. Element 17: wherein commands for validating the ICE candidate structure include commands for using an algorithm selected from one of a neural network model, a linear model, or a polynomial model relating tool input to the fluid characteristic of interest. Element 18: wherein commands for selecting a database include commands for selecting an optical-Pressure, Volume, and Temperature (PVT) spectroscopy and analyte database including a plurality of optical-PVT data from light and medium oils, gas condensates, gas, heavy oils, water and multiphase mixtures. Element 19 wherein commands for adjusting a plurality of ICE operational parameters according to an environmental factor include commands for performing a temperature correction of at least one ICE material according to an environmental condition of a fluid spectroscopy and an analyte in the database, and wherein the at least one ICE material includes a material in one of a high refraction index layer, a low refraction index layer, or a substrate.

What is claimed is:

1. A method, comprising:
    selecting a database for integrated computational element (ICE) design;
    adjusting a plurality of ICE operational parameters according to an environmental factor recorded in the database;
    simulating environmentally compensated calibration inputs;
    modifying a plurality of ICE structure parameters to obtain an ICE candidate structure having improved performance according to a first algorithm applied to the database;
    validating the ICE candidate structure with an alternative algorithm applied to the database;
    determining a plurality of manufacturing ICEs based on the validation with the first algorithm and the alternative algorithm; and
    fabricating one of the plurality of manufacturing ICEs.

2. The method of claim 1, wherein modifying the plurality of ICE structure parameters includes at least one of modifying a number of layers of material in the ICE candidate structure or modifying a thickness of an existing layer of material in the ICE candidate structure.

3. The method of claim 1, wherein validating the ICE candidate structure includes estimating at least one of a standard error of prediction (SEP), a standard error of calibration (SEC), a variance, a sensitivity and a specificity value associated with the ICE candidate structure.

4. The method of claim 1, wherein validating the ICE candidate structure includes using an algorithm selected from one of a neural network model, a linear model, or a polynomial model relating tool input to the fluid characteristic of interest.

5. The method of claim 1, wherein selecting the database includes selecting an optical-PVT spectroscopy and analyte database including a plurality of optical-PVT data from light and medium oils, gas condensates, gas, heavy oils, water and multiphase mixtures.

6. The method of claim 1, wherein adjusting the plurality of ICE operational parameters according to an environmental factor includes a temperature correction of high and low refraction index constants of ICE materials in simulating an ICE response complying with an environmental condition of at least one of a fluid spectroscopy and an analyte in the database.

7. The method of claim 1, wherein adjusting the plurality of ICE operational parameters according to an environmental factor includes a temperature correction of a substrate material in simulating an ICE response complying with an environmental condition of at least one of a fluid spectroscopy and an analyte in the database.

8. The method of claim 1, wherein adjusting the plurality of ICE operational parameters according to environmental factors further includes correcting a temperature effect on an optical response of at least one of an optical filter, a window and a detector related to an ICE response.

9. The method of claim 1, wherein adjusting the ICE operational parameters according to an environmental factor includes measuring fabricated ICE transmittance spectra under different temperature settings.

10. The method of claim 1, wherein the validating the ICE candidate structure with an alternative algorithm includes using at least one of a neural network algorithm, a linear algorithm, and a polynomial data mapping algorithm.

11. The method of claim 1, wherein fabricating one of the plurality of manufacturing ICEs further includes:
   measuring a thickness of a deposited layer;
   incorporating the measured layer thickness with a plurality of target film thicknesses on subsequent layers of the one of the plurality of manufacturing ICEs in a fluid prediction model to predict a performance of an ICE being fabricated; and
   adjusting a thickness on a subsequent layer of the manufacturing ICE according to the predicted performance of the ICE being fabricated.

12. A non-transitory, computer readable medium storing commands which, when executed by a processor in a controller, cause the controller to perform a method comprising:
   selecting a database for integrated computational element (ICE) design;
   adjusting a plurality of ICE operational parameters according to an environmental factor recorded in the database;
   simulating environmentally compensated calibration inputs;
   modifying a plurality of ICE structure parameters to obtain an ICE candidate structure having improved performance according to a first algorithm applied to the database;
   validating the ICE candidate structure with an alternative algorithm applied to the database;
   determining a plurality of manufacturing ICEs based on the validation with the first algorithm and the alternative algorithm; and
   fabricating one of the plurality of manufacturing ICEs.

13. The non-transitory, computer-readable medium of claim 12, wherein the commands for modifying a plurality of ICE structure parameters include commands for at least one of modifying a number of layers of material in the ICE structure or modifying a thickness of an existing layer of material in the ICE structure.

14. The non-transitory, computer-readable medium of claim 12, wherein commands for validating the ICE candidate structure include commands for estimating at least one of a standard error of prediction (SEP) a standard error of calibration (SEC), a variance, a sensitivity and a specificity value associated with the ICE candidate structure.

15. The non-transitory, computer-readable medium of claim 12, wherein commands for validating the ICE candidate structure include commands for using an algorithm selected from one of a neural network model, a linear model, or a polynomial model relating tool input to the fluid characteristic of interest.

16. The non-transitory, computer-readable medium of claim 12, wherein commands for selecting a database include commands for selecting an optical-Pressure, Volume, and Temperature (PVT) spectroscopy and analyte database including a plurality of optical-PVT data from light and medium oils, gas condensates, gas, heavy oils, water and multiphase mixtures.

17. The non-transitory, computer-readable medium of claim 12, wherein commands for adjusting a plurality of ICE operational parameters according to an environmental factor include commands for performing a temperature correction of at least one ICE material according to an environmental condition of a fluid spectroscopy and an analyte in the database, and wherein the at least one ICE material includes a material in one of a high refraction index layer, a low refraction index layer, or a substrate.

* * * * *